United States Patent
Wise et al.

(10) Patent No.: US 9,031,100 B2
(45) Date of Patent: May 12, 2015

(54) BROADBAND SHORT PULSE FIBER LASERS CAPABLE OF GENERATING OUTPUT SPECTRA BROADER THAN GAIN BANDWIDTH

(71) Applicant: Cornell University, Ithaca, NY (US)

(72) Inventors: Frank W. Wise, Ithaca, NY (US); Andy Chong, Dayton, OH (US); William Renninger, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/377,841

(22) PCT Filed: Feb. 11, 2013

(86) PCT No.: PCT/US2013/025651
§ 371 (c)(1),
(2) Date: Aug. 8, 2014

(87) PCT Pub. No.: WO2013/120113
PCT Pub. Date: Aug. 15, 2013

(65) Prior Publication Data
US 2015/0030039 A1    Jan. 29, 2015

Related U.S. Application Data

(63) Continuation of application No. 13/530,044, filed on Jun. 21, 2012, now Pat. No. 8,787,411.

(60) Provisional application No. 61/597,692, filed on Feb. 10, 2012, provisional application No. 61/499,296, filed on Jun. 21, 2011.

(51) Int. Cl.
| | |
|---|---|
| *H01S 3/30* | (2006.01) |
| *H01S 3/067* | (2006.01) |
| *H01S 3/08* | (2006.01) |
| *H01S 3/11* | (2006.01) |
| *H01S 3/16* | (2006.01) |

(52) U.S. Cl.
CPC ......... *H01S 3/06791* (2013.01); *H01S 3/08027* (2013.01); *H01S 3/06725* (2013.01); *H01S 3/1118* (2013.01); *H01S 3/0675* (2013.01); *H01S 3/1618* (2013.01)

(58) Field of Classification Search
CPC .......... H01S 3/30; H01S 3/13; H01S 3/1118; H01S 3/1618; H01S 3/06725; G02B 6/26
USPC ................................ 372/6, 25; 359/238, 239
See application file for complete search history.

(56) References Cited

U.S. PATENT DOCUMENTS

| | | | | |
|---|---|---|---|---|
| 5,513,194 A | * | 4/1996 | Tamura et al. | 372/6 |
| 2010/0296154 A1 | * | 11/2010 | Solli et al. | 359/333 |

* cited by examiner

*Primary Examiner* — Tuan Nguyen
(74) *Attorney, Agent, or Firm* — Perkins Coie LLP

(57) ABSTRACT

Implementations and examples of fiber lasers based on fiber laser cavity designs that produce self-similar pulses ("similaritons") to achieve a pulse spectral bandwidth greater than a gain spectral bandwidth based on a spectral broadening fiber segment and a spectral filter to ensure the proper similariton conditions.

18 Claims, 20 Drawing Sheets

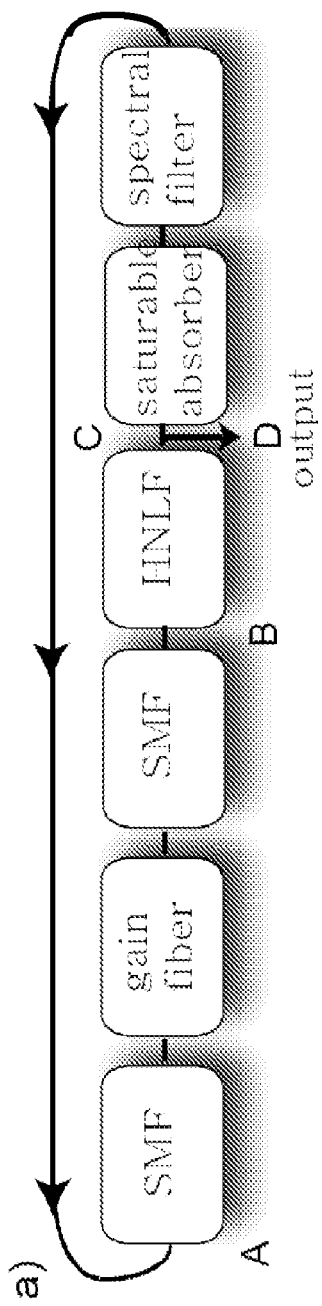
FIG. 15A
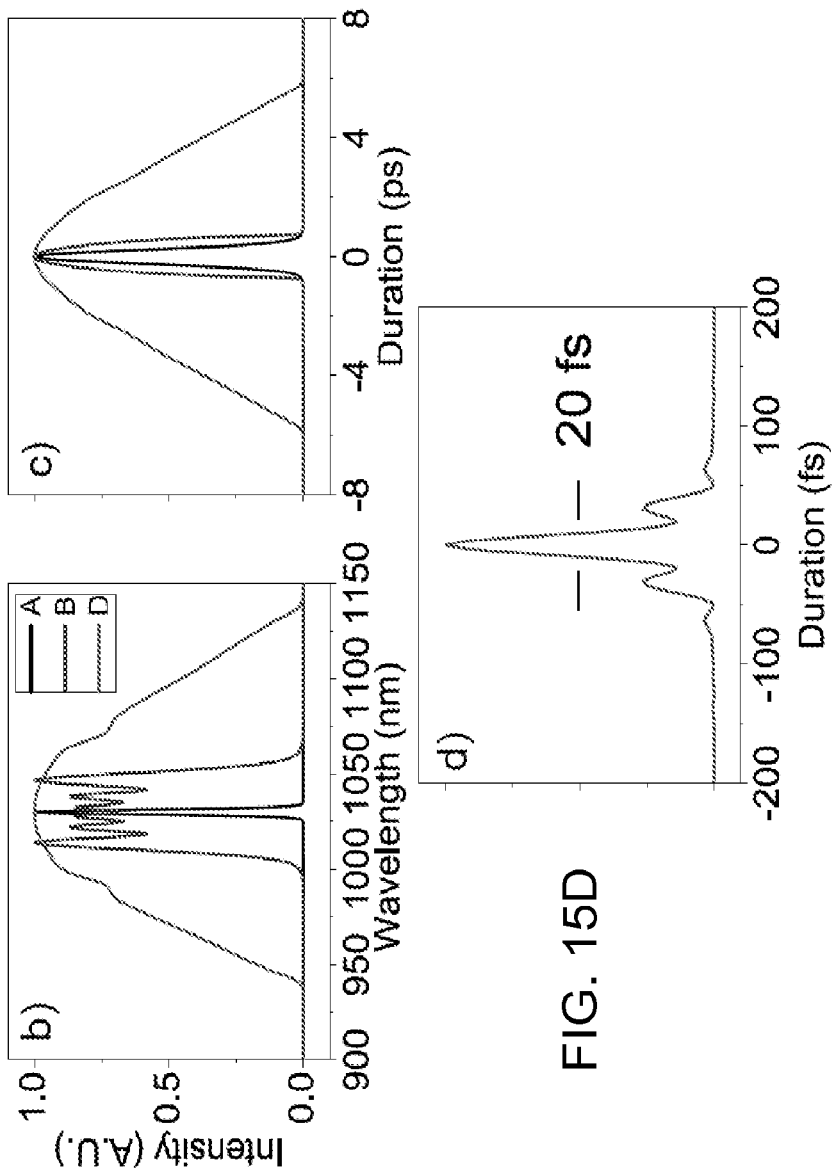
FIG. 15B
FIG. 15C
FIG. 15D

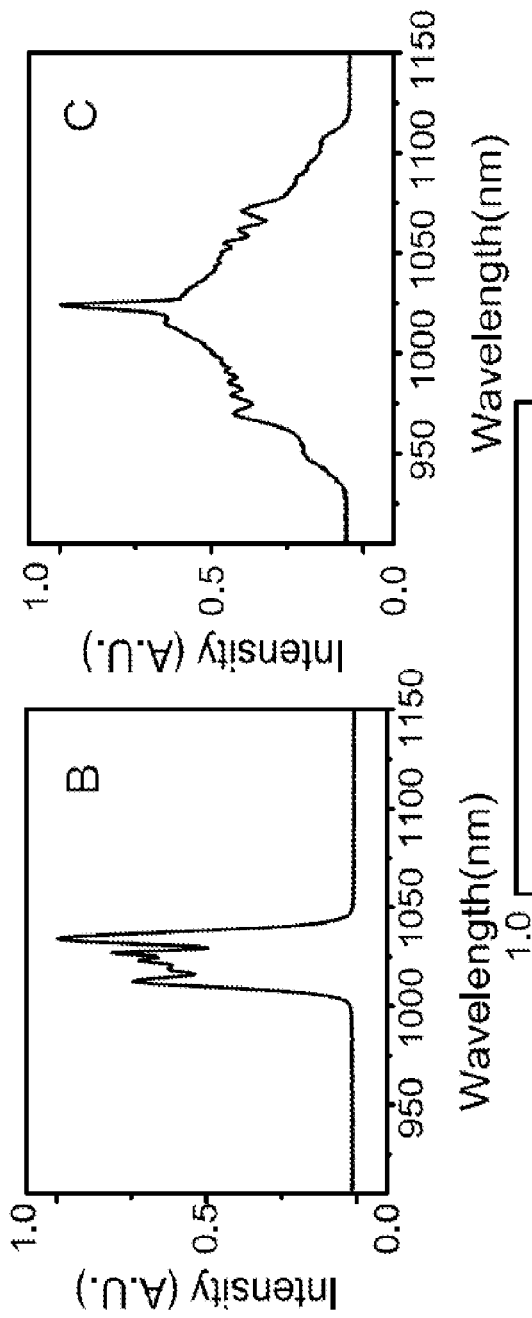
FIG. 16A
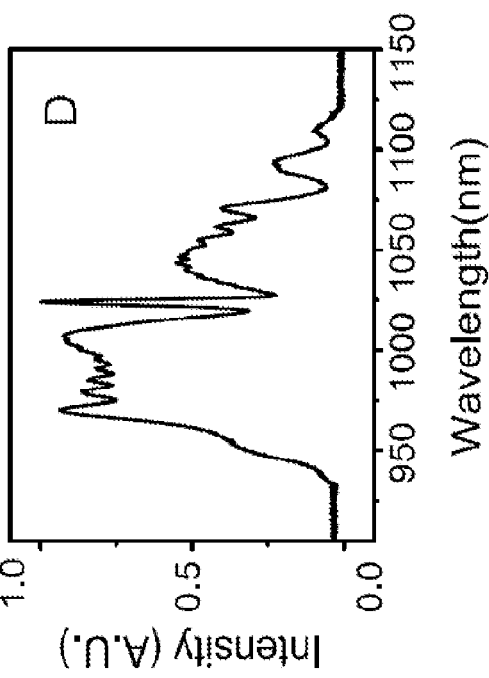
FIG. 16B
FIG. 16C

BROADBAND SHORT PULSE FIBER LASERS CAPABLE OF GENERATING OUTPUT SPECTRA BROADER THAN GAIN BANDWIDTH

PRIORITY CLAIMS AND RELATED PATENT APPLICATIONS

This PCT application claims the benefit of U.S. Provisional Application No. 61/597,692 entitled "BROADBAND FIBER LASERS CAPABLE OF GENERATING OUTPUT SPECTRA BROADER THAN THE GAIN BANDWIDTH" and filed Feb. 10, 2012.

This PCT application further claims the benefit of U.S. patent application Ser. No. 13/530,044 entitled "MODE-LOCKED FIBER LASER BASED ON NARROWBAND OPTICAL SPECTRAL FILTERING AND AMPLIFIER SIMILARITONS" and filed Jun. 21, 2012. The U.S. application Ser. No. 13/530,044 further claims the benefit of U.S. Provisional Application No. 61/499,296 entitled "AMPLIFIER SIMILARITON FIBER LASER, METHODS, AND APPLICATIONS" and filed Jun. 21, 2011.

The entire disclosure of the above-referenced applications is incorporated by reference as part of the specification of this PCT application.

STATEMENT REGARDING FEDERALLY SPONSORED RESEARCH OR DEVELOPMENT

This invention was made with government support under ECCS-0901323 awarded by National Science Foundation (NSF) and with the government support under EB002019 awarded by National Institutes of Health (NIH). The government has certain rights in the invention.

BACKGROUND

This patent document relates to mode-locked fiber lasers.

Mode-locked fiber lasers for generating laser pulses can be configured to have simple laser cavity designs, compact packaging, good operation stability and relatively low cost in comparison with solid-state mode-locked lasers systems. Mode-locked fiber lasers, optical fibers, fiber components used in such lasers also provide convenient and reproducible device settings for the study of a variety of nonlinear dynamical processes. Such fiber lasers use doped gain fibers to provide the optical gain for the laser operation. The gain bandwidth of the gain fiber in a fiber laser is generally viewed as a primary factor that limits the bandwidth of the fiber laser.

SUMMARY

This patent document describes implementations and examples of mode-locked fiber lasers based on fiber laser cavity designs that produce self-similar pulses ("similaritons"). For example, the laser pulses in such fiber lasers can exhibit parabolic pulse profiles with respect to time at the output of the fiber gain media to effectuate the desired mode locking operation. An intra-cavity narrowband optical spectral filter is included in such fiber lasers to ensure the proper similariton conditions. Notably, a spectral broadening fiber segment can be included in fiber lasers to broaden a pulse spectral width to be greater than a gain spectral bandwidth of the gain fiber segment in the fiber lasers to achieve ultrashort laser pulses. Such fiber lasers can be configured in various configurations, including using all normal dispersion components within the laser cavities, using both normal dispersion components and anomalous dispersion components to have certain desired dispersion maps within the laser cavities. The spectral broadening fiber segment can be implemented in various configurations, including highly nonlinear optical fiber segments or dispersion decreasing fiber segments in the laser cavities.

In one aspect, a fiber laser is provided for generating broadband laser pulses with a spectral bandwidth greater than a gain spectral bandwidth of a gain fiber segment in the fiber laser. This fiber laser includes a gain fiber segment having a gain spectral bandwidth and operable to amplify laser pulses, a spectral broadening fiber segment coupled to receive output light from the gain fiber segment and operable to cause spectral broadening of laser pulses to have a spectral bandwidth greater than the gain spectral bandwidth of the gain fiber segment, and an optical spectral filter coupled to receive light from the spectral broadening fiber segment to output filtered light to the gain fiber segment to selectively transmit light in a narrow spectral band while rejecting light outside the narrow spectral band and to have a bandwidth for the narrowband that is sufficiently narrow to cause each laser pulse to be self similar after propagating through the gain fiber segment. The fiber laser is configured to form a unidirectional closed optical loop by the gain fiber segment, the spectral broadening fiber segment and the optical spectral filter to direct each laser pulse, sequentially, through the gain fiber segment, the spectral broadening fiber segment and the optical spectral filter. The fiber laser couples light out of the closed optical loop at a location between the spectral broadening fiber segment and the optical spectral filter to produce output laser pulses with a pulse spectral bandwidth greater than the gain spectral bandwidth.

In another aspect, a method is provided for operating a fiber laser to generate broadband laser pulses with a spectral bandwidth greater than a gain spectral bandwidth of a gain fiber segment in the fiber laser. This method includes providing a ring laser cavity to include a gain fiber segment having a gain spectral bandwidth, a spectral broadening fiber segment coupled to receive output light from the gain fiber segment, and an optical spectral filter coupled to receive light from the spectral broadening fiber segment to circulate laser pulses in a closed optical loop to, sequentially, pass through the gain fiber segment, the spectral broadening fiber segment and the optical spectral filter; operating the optical spectral filter to output filtered light to the gain fiber segment downstream in the closed optical loop to selectively transmit light in a narrow spectral band while rejecting light outside the narrow spectral band and to have a bandwidth for the narrowband that is sufficiently narrow to cause each laser pulse to be self similar after propagating through the gain fiber segment; and directing amplified laser pulses out of the gain fiber segment into the spectral broadening fiber segment to produce chirped self-similar laser pulses circulating in the fiber laser to have a pulse spectral bandwidth in each laser pulse output by the spectral broadening fiber segment to be greater than the gain spectral bandwidth of the gain fiber segment. In this method, the spectral broadening fiber segment and the optical spectral filter collectively cause each laser pulse to have a varying spectral width in the closed optical loop that reaches a maximum spectral width value at the exit of the spectral broadening fiber segment and a minimum spectral width value at the output of the optical spectral filter.

In yet another aspect, a method is provided for operating a fiber laser to generate broadband laser pulses with a spectral bandwidth greater than a gain spectral bandwidth of a gain fiber segment in the fiber laser and includes directing laser pulses into the gain fiber segment in the fiber laser to amplify the laser pulses, and directing the amplified laser pulses out of the gain fiber segment into an intro-cavity spectral broadening fiber segment such as a nonlinear fiber segment in the fiber laser to produce chirped self-similar laser pulses that have a pulse spectral bandwidth greater than the gain spectral bandwidth of the gain fiber segment.

These and other aspects of fiber lasers based on similariton cavity designs are described in greater detail in the drawing, the description and the claims.

BRIEF DESCRIPTION OF DRAWINGS

FIG. 15 through FIG. 20 show implementations of the design in FIG. 1B by using either HNLF or DDF as the spectral broadening fiber segment in FIG. 1B.

DETAILED DESCRIPTION

Fiber lasers and methods described herein use an intro-cavity spectral broadening fiber segment at the output side of the gain fiber segment which is part of the fiber amplifier of a unidirectional closed optical loop in a fiber laser to generate broadband laser pulses with a spectral bandwidth greater than a gain spectral bandwidth of a gain fiber segment in the fiber laser. The closed optical loop of such a fiber laser is structured to provide conditions for supporting and sustaining self-similar laser pulses by using a narrowband spectral optical filter at the input side of the gain fiber segment.

Figure 1A:
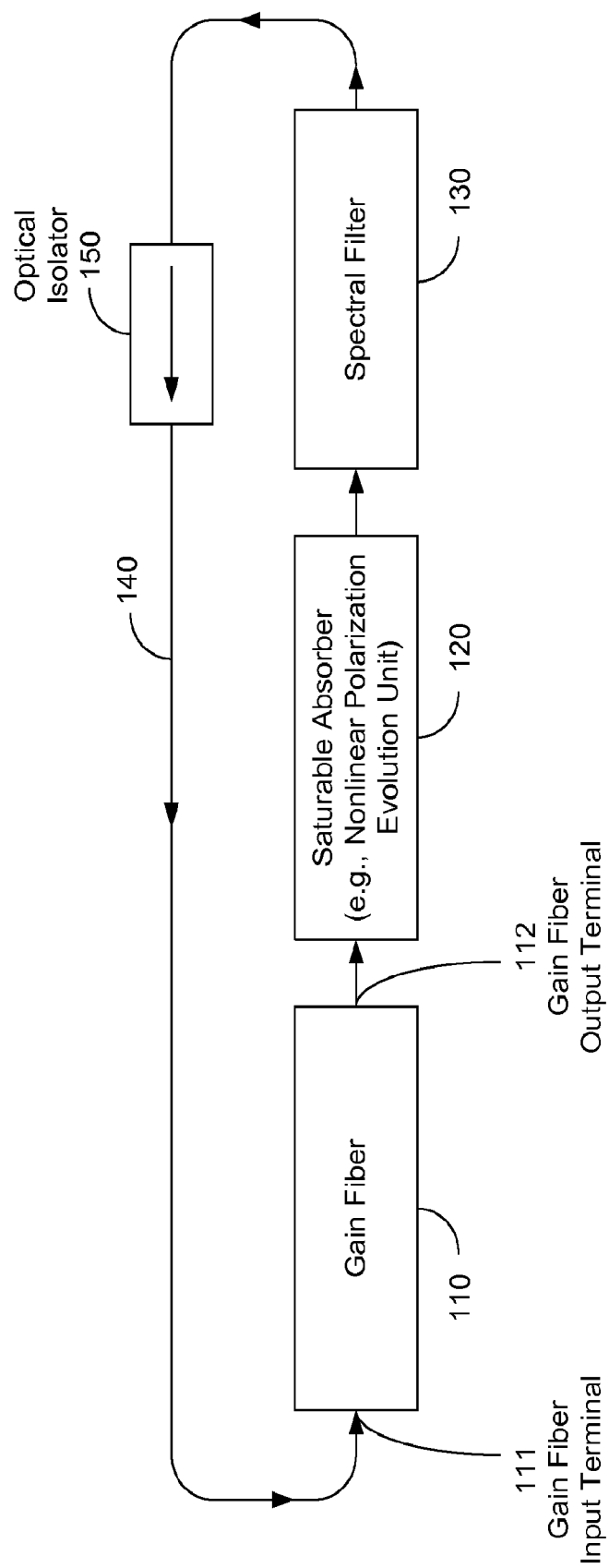
FIG. 1A shows an example of a mode-locked fiber laser based on narrowband optical spectral filtering and generation of similaritons at the output of the fiber gain section.

FIG. 1A shows an example of a laser device based on mode locking and generation of self-similar pulses ("similaritons") that are parabolic pulses. This laser device is a ring laser and its laser cavity includes a fiber amplifier 110 having a gain fiber section that exhibits an optical gain with a gain spectral bandwidth and operates, a saturable absorber 120 coupled to receive output light from the fiber amplifier 110 and an optical spectral filter 130 coupled to receive light from the saturable absorber 120 and to direct light to the fiber amplifier 110 via an optical path 140 connecting the fiber amplifier 110 and the filter 130. An optical isolator 150 is inserted in the laser cavity to ensure unidirectional propagation of light as shown in the counter clockwise direction. The fiber amplifier 110 may be optically pumped by using a pump light source and to amplify light at the laser carrier wavelength within the gain spectral bandwidth. The fiber amplifier 110 can cause each laser pulse to increase a pulse duration and a pulse spectral width from entry 111 of the gain fiber section 110 to exit 112 of the gain fiber section 110. The saturable absorber 120 exhibits saturable absorption of light with the light intensity and is operable to reduce the pulse duration and the pulse spectral width of each laser pulse. In implementations, a saturable absorber with a sufficient modulation depth should suffice for self starting the mode locking operation in the laser. The saturable absorber can be implemented various configurations such as NPE as described in the examples presented here, a SESAM (saturable absorber mirror), or CNT (carbon nanotubes) or other saturable absorbers that are used for mode-locking femtosecond fiber lasers.

The optical spectral filter 130 is coupled between the saturable absorber 120 and the fiber amplifier 110 to further reduce the pulse duration and the pulse spectral width of each laser pulse coming out of the saturable absorber 120. The optical spectral filter 130 selectively transmits light in a single narrowband while rejecting light outside the narrowband. Notably, the optical spectral filter 130 is configured to have a bandwidth for the narrowband that is sufficiently narrow to cause each laser pulse to be self similar after propagating through the fiber amplifier 110 and to evolve into a parabolic pulse profile with respect to time at the exit 112 of the fiber amplifier 110 to effectuate mode locking that generates the laser pulses. In some implementations, for laser pulses with an optical wavelength around 1.03 micron, the bandwidth of the optical spectral filter 130 should be around or less than 5 nm. For such lasers operating at a wavelength $\lambda$, the bandwidth of the optical spectral filter 130 can be estimated by 5 nm$\times(\lambda/1.03)^2$ where $\lambda$, is in microns.

The laser device in FIG. 1A can be designed to produce and sustain parabolic amplifier similaritons. The self-similar pulse is a local nonlinear attractor in the gain segment 110 of the laser device. The evolution in the laser cavity can exhibit a large (e.g., 20 times) spectral breathing, and the pulse chirp is less than the group-velocity dispersion of the laser cavity. These features are consistent with numerical simulations. The amplifier similariton evolution also yields practical features such as parabolic output pulses with high energies, and laser pulses with short pulse durations that are difficult to achieve in other laser and fiber laser designs.

The spectral breathing of a laser cavity described here is represented by a varying spectral width in each laser pulse along an optical path within the laser cavity that reaches a maximum spectral width value at the exit of the fiber amplifier and a minimum spectral width value at the output of the optical spectral filter. The spectral breathing ratio is the ratio between the maximum spectral width value over the minimum spectral width value. For lasers described in this document, the spectral breathing ratio is greater than 5 and can be greater than 10 or higher.

The dispersion of the laser cavity in FIG. 1A can be designed as an all-normal-dispersion (ANDi) cavity where the dispersion at each location along the optical path of the laser cavity is normal. In addition, the laser cavity may be configured to have both normal dispersion and anomalous dispersion elements or segments to form a desired dispersion map within the laser cavity. The following sections first consider examples of ANDi laser cavity designs and then provide examples of laser cavities with dispersion maps and with intra-cavity nonlinear fiber. ANDi laser cavity designs can support dissipative solitons in the cavity, and provide performance comparable to solid-state mode-locked lasers. In addition, ANDi designs allow for simple instruments at a lasing wavelength of 1 μm, an ideal wavelength for optical bandwidth and efficiency.

The principle of laser physics dictates that short pulse durations in fiber lasers require broad spectral width of the generated laser pulses. Ti:Sapphire lasers are known for their ability to produce ultrashort laser pulses because of their broad gain bandwidths, e.g., 270 THz. It is technically difficult to manufacture gain fibers with gain bandwidths similar to those in Ti:Sapphire crystals. Various laser techniques for additional pulse amplification and processing outside a fiber laser have been developed to produce ultrashort laser pulses, such as chirped pulse amplification (CPA) where a train of short laser pulses from a pulsed laser are processed outside the pulsed laser cavity by first stretching the laser pulses to a large duration, next amplifying the stretched pulses by one or more fiber amplifiers to increase the pulse energy while maintaining the undesired nonlinear optical effects and pulse distortions below a desired tolerance level due to the stretched long pulse duration, and finally compressing the stretched and amplified laser pulses to a desired short pulse duration to achieve high-peak-power and short laser pulses. The techniques described herein are intra-cavity mechanisms inside the laser cavity of a fiber laser to enable the fiber laser to produce a broad bandwidth in laser operation beyond the bandwidth of the gain fiber in the fiber laser.

With existing techniques for mode-locking, the bandwidth of ultrashort pulses from a laser is determined primarily by the spectrum of the gain medium. Lasers with self-similar evolution of the pulse in the gain medium can tolerate strong spectral breathing, which is stabilized by nonlinear attraction to the parabolic self-similar pulse. Here we show that this property can be exploited to circumvent the limitation of the gain bandwidth in a fiber laser. Laser pulses with broad spectra, e.g., a bandwidth of about 200 nm, are generated through passive nonlinear propagation in a normal-dispersion laser, and these laser pulses can be dechirped to achieve short laser pulse duration, e.g., about 20-fs in pulse duration in some implementations.

Short light pulses that can be generated by a laser oscillator is of fundamental interest to the field of ultrafast science, and the short pulse duration determines the time resolution or bandwidth of many measurements. A critical factor in the design of an ultrashort-pulse laser is the bandwidth of the gain medium. The pulse duration can be represented by the number of cycles of the varying electromagnetic field of the laser pulses. Many short pulse lasers that generate few-cycle pulses (e.g. with a pulse duration of about 10 fs) tend to use titanium-doped sapphire crystals as the gain media and exploit the large gain bandwidth of about 270 THz of titanium-doped sapphire crystals. Spectra that exceed the gain bandwidth, and pulses that approach a single cycle in duration, have been generated through nonlinear spectral broadening and preferential output coupling of the edges of the spectrum.

Much of the understanding of mode-locked lasers comes from analytic solutions of equations based on the assumption of small changes in a pulse as it traverses the cavit. The intracavity pulse evolution in even a 10-fs Ti:sapphire laser is not extreme, because the crystal comprises roughly one characteristic dispersion length ($L_D$) of propagation: $L_D = \tau^2/|\beta_2| \sim 1$ mm, where $\tau$ is the pulse duration and $\beta_2$ is the second-order dispersion coefficient. When the approximations of the model break down, perturbative [3] and numerical analyses are employed.

There is substantial motivation to develop 10-fs fiber lasers. The pulse energy and peak power of femtosecond fiber lasers are now reaching those of solid-state lasers, but fiber oscillators have not reached the few-cycle regime. Few-cycle pulses can be generated by pulse compression or by interfering the spectra of two separate continua seeded by a fiber laser. Direct generation from an oscillator should impact applications by improving the stability, and reducing the complexity and cost of the source. Applications would include optical coherence tomography, generation of seed pulses for atto second science, frequency metrology, nonlinear microscopy [8] and microspectroscopy, among others.

The gain bandwidth of ytterbium-doped silica fiber [9] is about ¼ that of Ti:sapphire. Gain extends over a maximum of 100-150 nm, with the short-wavelength limit of the gain determined by the pump absorption band. An ultimate limitation to the bandwidth that can be generated in a fiber laser is the cut-off wavelength, below which the fiber does not act as a waveguide. Single-mode fiber (SMF) designed to operate near 1 μm typically has a cutoff wavelength near 900 nm. At 1 μm wavelength (appropriate for Yb-doped fiber), a 10-fs pulse requires over 300 nm of total bandwidth. Consistent with the available bandwidth of Yb fiber, experiments produce total bandwidths up to 100-120 nm, and pulses as short as ~30 fs [10, 11].

In some implementations, a fiber laser can be configured to include about 1 m of fiber. $L_D$~2 mm for a 10-fs pulse, so a 10-fs fiber laser will comprise hundreds of dispersion lengths. The pulse evolution in such a laser will have to involve extreme spectral and temporal changes. Many existing approaches to mode-locking evidently are incapable of reaching the few-cycle limit in fiber lasers owing to the gain bandwidth limitation.

Self-similar evolution is a powerful technique to avoid distortion of optical pulses that propagate nonlinearly. Pulses with a parabolic intensity profile and linear frequency chirp can be expressed as $$A(z,t) = \overline{A_0(z)}\sqrt{1-(t/t_0(z))^2}\ e^{i(a(z)-b(z)t^2)}$$

where, for $t \leq t_0(z)$, the pulses are asymptotic solutions of the nonlinear Schrodinger equations that govern pulse propagation in passive or active fiber with positive nonlinear refraction and normal group-velocity dispersion (GVD). These pulses accumulate substantial nonlinear phase shifts without undergoing wave-breaking or more dramatic distortions such as pulse fission. For an amplifier with constant gain, the asymptotic solution is a nonlinear attractor; a range of inputs to the amplifier evolve to the self-similar solution. The chirped self-similar pulses ("similaritons") can be compressed to the Fourier-transform limit by passing them through a dispersive delay.

Short-pulse lasers based on self-similar pulse propagation in their gain segments can exhibit strong spectral breathing, with the bandwidth varying by an order of magnitude as the pulse traverses the resonator. Strong filtering stabilizes the evolution by allowing a short pulse to evolve to the parabolic solution before the end of the gain fiber. A remarkable feature of these lasers is that the similariton is a local nonlinear attractor in the gain segment of the laser. The pulse can change dramatically, or it can be intentionally manipulated, in the rest of the cavity, as long as the input to the amplifier falls within the basin of attraction of the self-similar solution. This property of the amplifier similariton evolution provides a valuable degree of freedom in the design of high-performance instruments.

In this patent document, a fiber laser based on the formation of amplifier similaritons can circumvent the fundamental limitations to the pulse bandwidth. In a resonator with large normal dispersion, spectral broadening in fiber after the gain segment produces output bandwidths that substantially exceed the gain bandwidth. The overall evolution is stabilized by filtering and the nonlinear attraction to the self-similar solution in the gain medium. Band-widths approaching 200 nm and pulses as short as 21 fs (the shortest from a fiber laser to date) are generated in initial experiments. This demonstration introduces a class of fiber lasers with clear potential for few-cycle pulse generation, and more broadly for producing a wide range of useful output pulses.

The spectral bandwidth of a similariton grows exponentially in an amplifier. However, the self-similar evolution is disrupted when the pulse bandwidth approaches the gain bandwidth of the amplifier and this limits the pulse energy and duration that can be achieved. The generation of pulses shorter than 30-40 fs from a self-similar amplifier based on Yb fiber can be difficult. It may be possible to extend or continue self-similar pulse evolution beyond an amplifier. For example, a fiber with lower dispersion and/or high nonlinear coefficient than the gain fiber can induce substantial spectral broadening. The linearly-chirped parabolic pulse produced by the amplifier tends to maintain close to a parabolic shape and linear chirp in the passive fiber. This evolution is related to the parabolic pulse compression scheme.

Figure 1B:
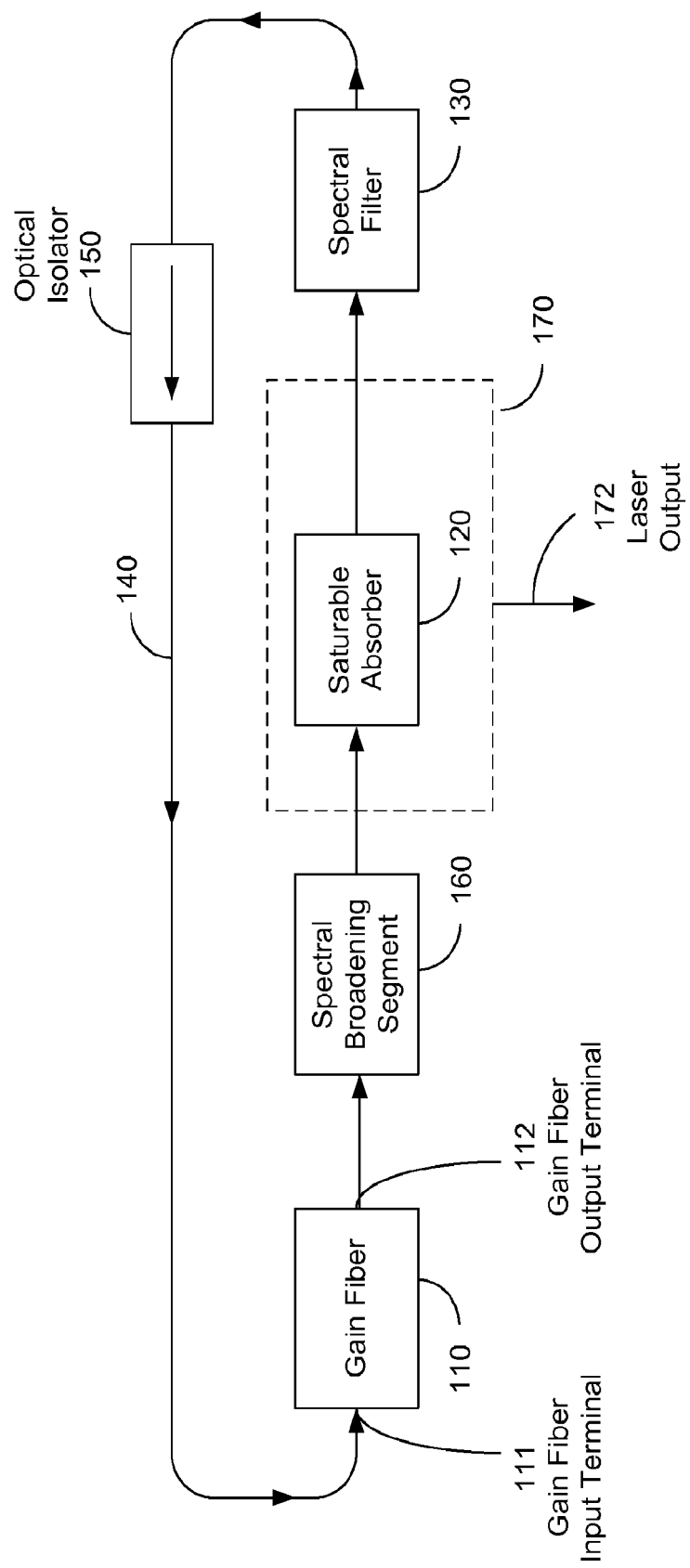
FIG. 1B shows an example of such a fiber laser that uses a spectral broadening fiber segment to achieve broadband laser pulses beyond the gain bandwidth.

FIG. 1B shows an example of such a fiber laser that uses a spectral broadening fiber segment to achieve broadband laser pulses beyond the gain bandwidth. The example in FIG. 1B is an example based on the laser design in FIG. 1A by providing a unidirectional closed optical loop cavity design (e.g., the optical isolator 150 is provided to ensure the unidirection property of the fiber laser). This fiber laser includes the gain fiber segment 110 having a gain spectral bandwidth and operable to amplify laser pulses, a spectral broadening fiber segment 160 coupled to receive output light from the gain fiber segment 110 and operable to cause spectral broadening of laser pulses to have a spectral bandwidth greater than the gain spectral bandwidth of the gain fiber segment 110, and an optical spectral filter 130 coupled to receive light from the spectral broadening fiber segment 160 to output filtered light to the gain fiber segment. The filter 130 is to selectively transmit light in a narrow spectral band while rejecting light outside the narrow spectral band and to have a bandwidth for the narrowband that is sufficiently narrow to cause each laser pulse to be self similar after propagating through the gain fiber segment. The fiber laser is configured to form a unidirectional closed optical loop by the gain fiber segment, the spectral broadening fiber segment and the optical spectral filter to direct each laser pulse, sequentially, through the gain fiber segment, the spectral broadening fiber segment and the optical spectral filter. The fiber laser couples light out of the closed optical loop at a location between the spectral broadening fiber segment and the optical spectral filter to produce output laser pulses with a pulse spectral bandwidth greater than the gain spectral bandwidth. For example, an optical output coupler 170 is shown to produce the laser output. This output coupler 170 can be implemented, for example, as part of the NPE/saturable absorber 120 or a separate element.

Self-similar pulses ("similaritons") are parabolic pulses that convert nonlinear phase into a linear frequency chirp that can be compensated with standard dispersive devices. Specifically, similaritons are solutions of the nonlinear Schrödinger equation with gain, $$\frac{\partial A}{\partial z} = \frac{g}{2}A - i\frac{\beta_2}{2}\frac{\partial^2 A}{\partial t^2} + i\gamma(|A|^2)A, \tag{1}$$

with the form $$A(z,t) = A_0(z)\sqrt{1-[t/t_0(z)]^2}\ e^{i(a(z)-bt^2)} \tag{2}$$

for $t \leq t0(z)$. Similaritons were first demonstrated theoretically and experimentally in single-pass fiber amplifiers. Self-similar evolution of a pulse in the passive fiber of a laser has been observed, and leads to significant performance improvement in pulse energy over previously-studied evolutions.

Solitons in passive fiber and self-similar pulses in fiber amplifiers are the nonlinear attractors for pulse propagation in optical fiber, so they take on major fundamental importance. Solitons are static solutions of the nonlinear Schrödinger equation, and are therefore naturally amenable to systems with feedback. The demonstration of a laser that supports similaritons in its amplifier would be remarkable as a feedback system with a local nonlinear attractor that is not a static solution. The spectrum of the self-similar pulse broadens with propagation, so an immediate challenge is the need to compensate this in a laser cavity. The soliton formation based on both normal dispersion and anomalous dispersion elements or segments is thought to stabilize the similariton solution. Thus, self-similar pulse evolution was considered in lasers with dispersion maps.

The self-similar pulse formation in the amplifier of an ANDi laser shows that a range of inputs to the amplifier can evolve to the self-similar solution, which verifies the existence of the nonlinear attractor in that segment of the oscillator. This local nonlinear attractor suppresses effects from the average cavity parameters that are unavoidable in lasers with dispersion maps. The solutions exhibit large spectral breathing, but the pulse chirp is less than expected from the cavity dispersion. This new pulse evolution can be obtained over a broad range of parameters, which allows tuning the pulse duration, bandwidth, and chirp. For example, amplifier similaritons underlie the generation of the shortest parabolic pulses to date from a laser, in addition to the shortest pulses from any ANDi laser. The ability to generate high-energy chirped parabolic pulses or ultrashort pulses from a simple device is attractive for applications.

Numerical modeling illustrates the main features of a laser that can support amplifier similaritons, indicated schematically at the top of FIG. 2(a). The gain fiber 110 with normal group-velocity dispersion (GVD) dominates the parabolic pulse shaping. This is followed by a saturable absorber 120 which can be implemented in various configurations. For simulations, the saturable absorber 120 is assumed to be conversion of nonlinear polarization evolution (NPE) into amplitude modulation in the standard way. The laser cavity under our consideration is a ring: after the filter 130, the pulse returns to the gain fiber 110. Propagation in the gain fiber 110, neglecting modal birefringence, is modeled with the coupled equations for the orthogonal electric field polarization states, Ax and Ay:

$$\frac{\partial A_x}{\partial z} = \frac{g}{2}A_x - i\frac{\beta_2}{2}\frac{\partial^2 A_x}{\partial t^2} + i\gamma\left(|A_x|^2 + \frac{2}{3}|A_y|^2\right)A_x, \quad (3)$$

$$\frac{\partial A_y}{\partial z} = \frac{g}{2}A_y - i\frac{\beta_2}{2}\frac{\partial^2 A_y}{\partial t^2} + i\gamma\left(|A_y|^2 + \frac{2}{3}|A_x|^2\right)A_y,$$

where z is the propagation coordinate, t is the local time, $\beta_2 = 23$ fs$^2$/mm is the group-velocity dispersion, and $\gamma = 0.0044$ (Wm)$^{-1}$ is the cubic self-focusing nonlinear coefficient for the fiber. The linear gain coefficient is defined as $$g = \frac{g_0}{1 + \frac{\int [|A_x|^2 + |A_y|^2]dt}{E_{sat}}}, \quad (4)$$

where $g_0 = 6.9$ is the small-signal gain corresponding to a fiber amplifier with a gain of about 30 dB, Esat =170 pJ is the saturation energy, and the integral is calculated before propagation through the 2-m gain fiber. The polarization-dependent elements are treated with a standard Jones matrix formalism in the (x,y) basis. The NPE is implemented with a half-wave and a quarter-wave plate, a polarizer, and another quarter-wave plate, with orientations (with respect to the x axis) $\theta q1 = 2.21$ rads, $\theta h = 2.28$ rads, $\theta pol = \pi/2$, and $\theta q2 = 0.59$ rads, respectively. The filter is a Gaussian transfer function with 4-nm fullwidth at half-maximum (FWHM) bandwidth. In various implementations for providing practical oscillators, a linear loss may be imposed on the laser pulses after the filter (e.g., 70% in some designs). The initial field is white noise, and the model is solved with a standard symmetric split-step algorithm.

A typical stable evolution is shown in FIG. 2(a). The two polarization modes evolve almost identically, so the sums of the temporal and spectral intensities are plotted. The pulse duration and bandwidth increase in the gain fiber as the pulse evolves toward the asymptotic attracting solution in the fiber. The filter and saturable absorber reverse these changes.

The filter 130 provides the dominant mechanism for seeding the self-similar evolution in the amplifier 110. This design based on the filter 130 implies that only the initial pulse profile can impact the laser performance, and no additional nonlinear attraction is required. This approach is very different from soliton evolution. Both dissipative solitons and dispersion-managed parabolic pulses tend to have a nearly constant bandwidth in evolution, and the pulse duration increases due to the accumulation of linear phase. The amplifier similariton described in this document increases in duration as a consequence of its increase in bandwidth, which is an intrinsic property of the exact asymptotic solution. A key feature of amplifier similaritons is that the pulses evolve toward a parabolic asymptotic solution: each polarization component is parabolic at the end of the gain fiber [FIG. 2(b)]. The associated spectra exhibit some structure, as expected for a parabola with finite chirp [FIG. 2(b) inset]. In conducted simulations, no stable solution was found with a single-field equation and a saturable absorber with transmission that increases monotonically with intensity; and the coupling of the polarizations evidently provides some stabilizing function.

Figure 3A:
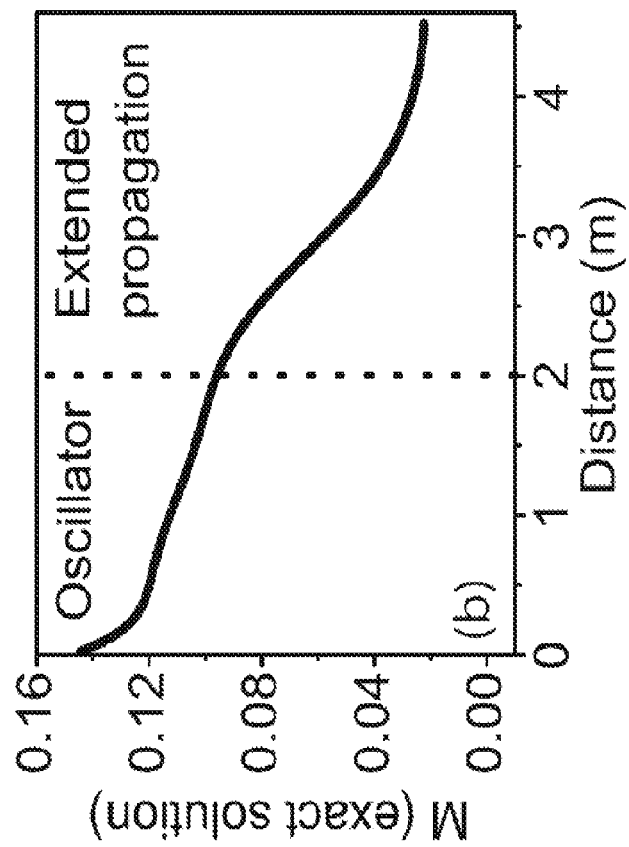
FIGS. 3A and 3B show evolution of the (a) M parameter comparing the pulse to a parabola and the (b) M parameter comparing the pulse to the exact solution in the oscillator. An additional 3 m of propagation was added to each plot to emphasize convergence.
Figure 3B:
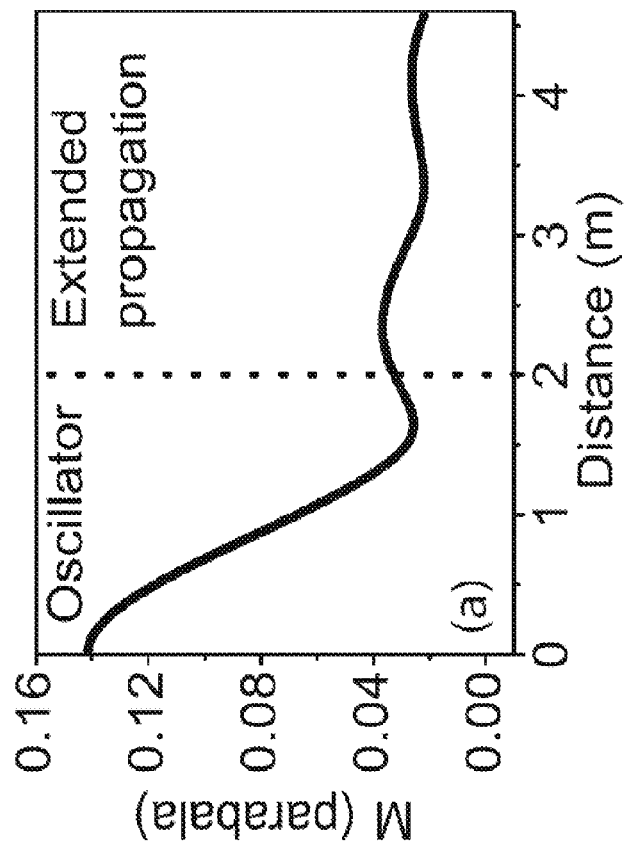

The pulse evolution can be quantified with the metric, $M2 = \int [|u|^2 - |p|^2]^2 dt / \int |u|^4 dt$, where u is the pulse being evaluated and p is a parabola with the same energy and peak power. In the gain fiber, the pulse evolves from a Gaussian profile (M=0.14) after the spectral filter to a parabola [FIG. 3A]. To verify that the pulse converges to a parabola, the pulse at the end of the 2-m gain fiber is taken as the initial condition for propagation through an additional 3 m of identical gain fiber, and the pulse remains parabolic [FIG. 3A]. To further confirm that the pulse is converging to the exact asymptotic solution, p from the $M^2$ metric is replaced with the pulse representing the asymptotic solution for this fiber. Conducted simulations show that the pulse indeed evolves toward the attractor in the gain fiber [FIG. 3B]. The resulting pulses exhibit a parabolic shape and large spectral breathing as is expected from the parabolic attractor. The numerical simulations clearly show the formation of the amplifier similariton inside the laser.

Figure 4:
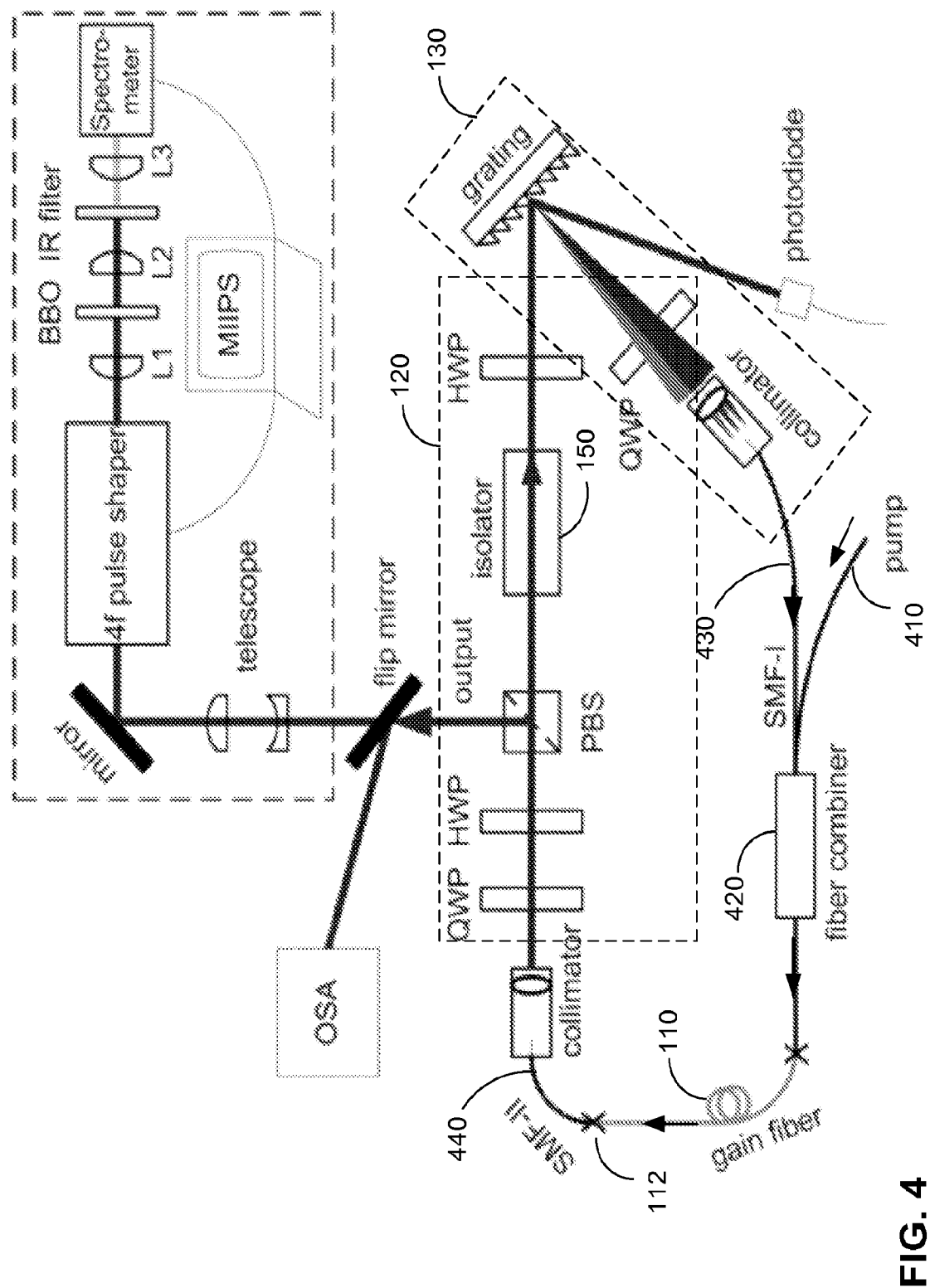
FIG. 4 shows an example of the double-clad Yb all-normal-dispersion fiber laser cavity and the setup for pulse characterization and adaptive compression via MIIPS (dash-line box). SMF-I and SMF-II: single mode passive fiber section I and II; QWP and HWP: quarter- and half-waveplates; PBS: polarizing beam splitter; OSA: optical spectrum analyzer; L1, 2, 3: plano-convex lenses.

FIG. 4 shows a mode-locked Yb fiber laser based on the above design for producing self-similar pulses with parameters similar to those of the simulations. The optical spectral filter 130 in FIG. 4 is implemented as a combination of a diffraction grating (e.g., 300 lines per millimeter) and an optical collimator. The diffraction grating is placed before the collimator so the laser pulses are directed from the grating into the collimator which can be a fiber collimator. The spectral width of this filter 130 can be controlled by adjusting the spacing between the distance between the grating and the fiber collimator. The wavelength-dependent diffraction along with the Gaussian dependence of the fiber acceptance angle yield a 4-nm Gaussian spectral filter when the collimator is 11 cm from the grating. Other optical filters can be used for the filter 130. In FIG. 4, along with the three wave plates required for NPE, an additional half-wave plate is placed between the isolator and the grating to optimize the transmission. The zeroth-order grating reflection is used as a secondary output for analysis. The Yb-doped double-clad gain fiber 110 is 1.8 m long and is pumped with a multimode pump diode. A segment 430 of 28 cm of single-mode fiber (SMF)(a collimator pigtail) precedes the gain fiber 110 and a pump/signal combiner 420. Another SMF of 100 cm is marked as "440" and is coupled to the collimator. The total length of SMF is 128 cm. All fibers in this example in FIG. 1A have normal GVD.

Figure 5:
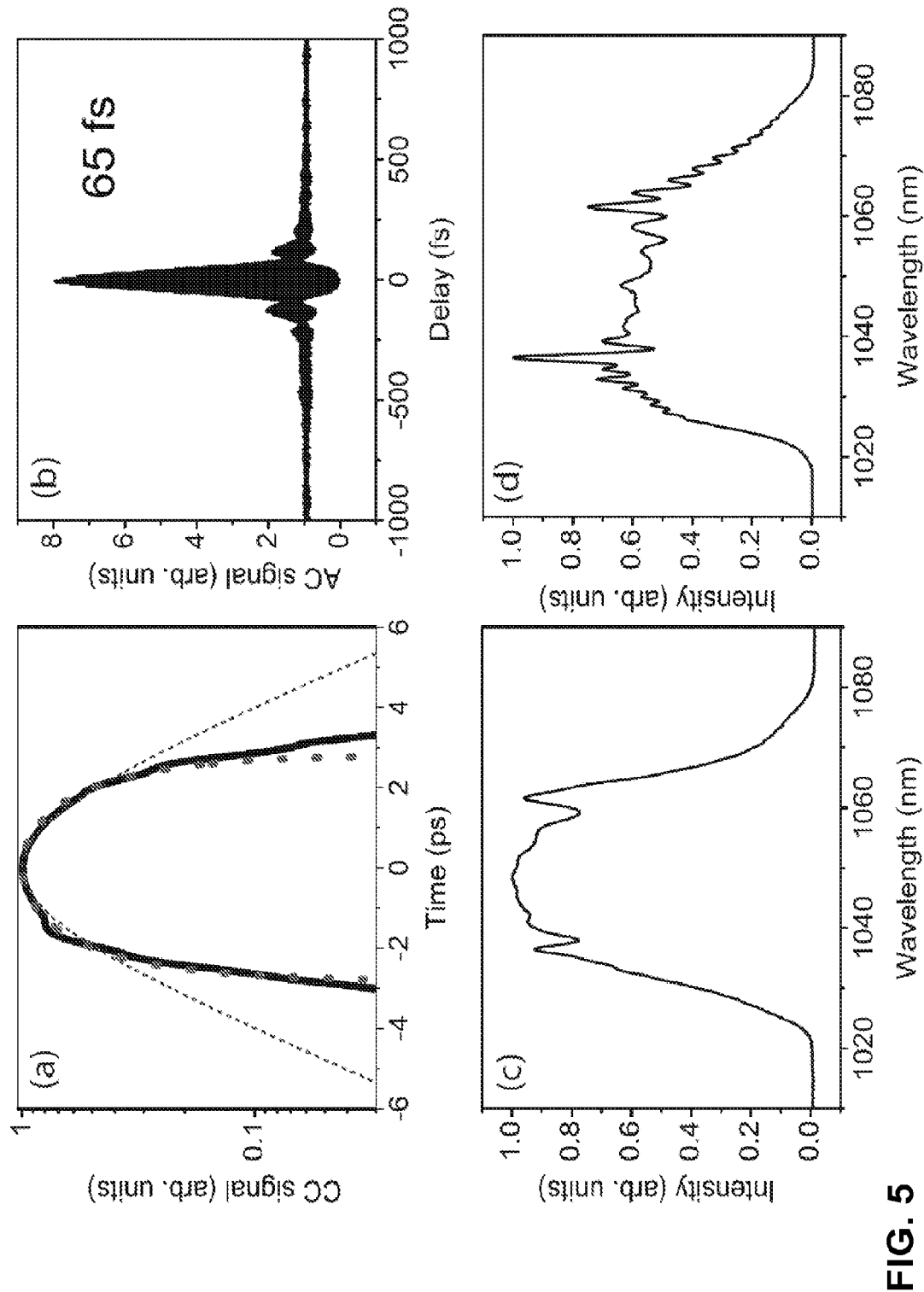
FIG. 5 shows experimental (a) cross-correlation of the pulse from the grating reflection (solid) with a parabolic (dotted) and sech2 (dashed) fit; (b) interferometric autocorrelation of the dechirped pulse from the NPE output; and spectra from the (c) grating reflection and (d) NPE output.

FIG. 5 shows self-starting mode-locking achieved by adjustment of the wave plates. The chirped pulse from the grating reflection is measured directly by cross-correlation with the dechirped pulse from the NPE output, which is 60 times shorter than the chirped pulse [FIG. 5(a)]. The pulse is parabolic and the spectrum [FIG. 5(c)] agrees well with the theoretical prediction for an amplifier similariton [FIG. 5(b), inset]. The shape of the spectrum is an immediate indication that this is a new regime of mode locking, as it lacks the characteristic steep edges of dissipative solitons in some normal-dispersion lasers. The spectral bandwidth breathes by a factor of about 10 as the pulse traverses the cavity. The pulse from the NPE output [FIG. 5(d)] can be dechirped to a duration of 65 fs [FIG. 5(b)], with minimal secondary structure. The pulse chirp (0.05 $ps^2$), inferred from the dispersion required to dechirp it to the transform limit, is less than the GVD of the cavity (0.08 $ps^2$). This is another feature of this regime, as prior ANDi lasers have generated pulses with chirp comparable to, or much greater than, the cavity GVD.

The narrow spectral filter 130 is important for the formation of similaritons in the amplifier. The challenge is for the pulse to reach the asymptotic solution in a fiber length that is compatible with efficient laser design. For a fixed frequency chirp, a pulse with a narrower spectrum is shorter and closer to the transform limit so that such a pulse can reach the single-pass amplifier similariton solution in a shorter segment of gain. A pulse propagating in normal-dispersion gain fiber is attracted to the similariton solution, but if the pulse duration is too long, the effect of this attraction can become negligible and the resulting pulse will not be parabolic.

Figure 6:
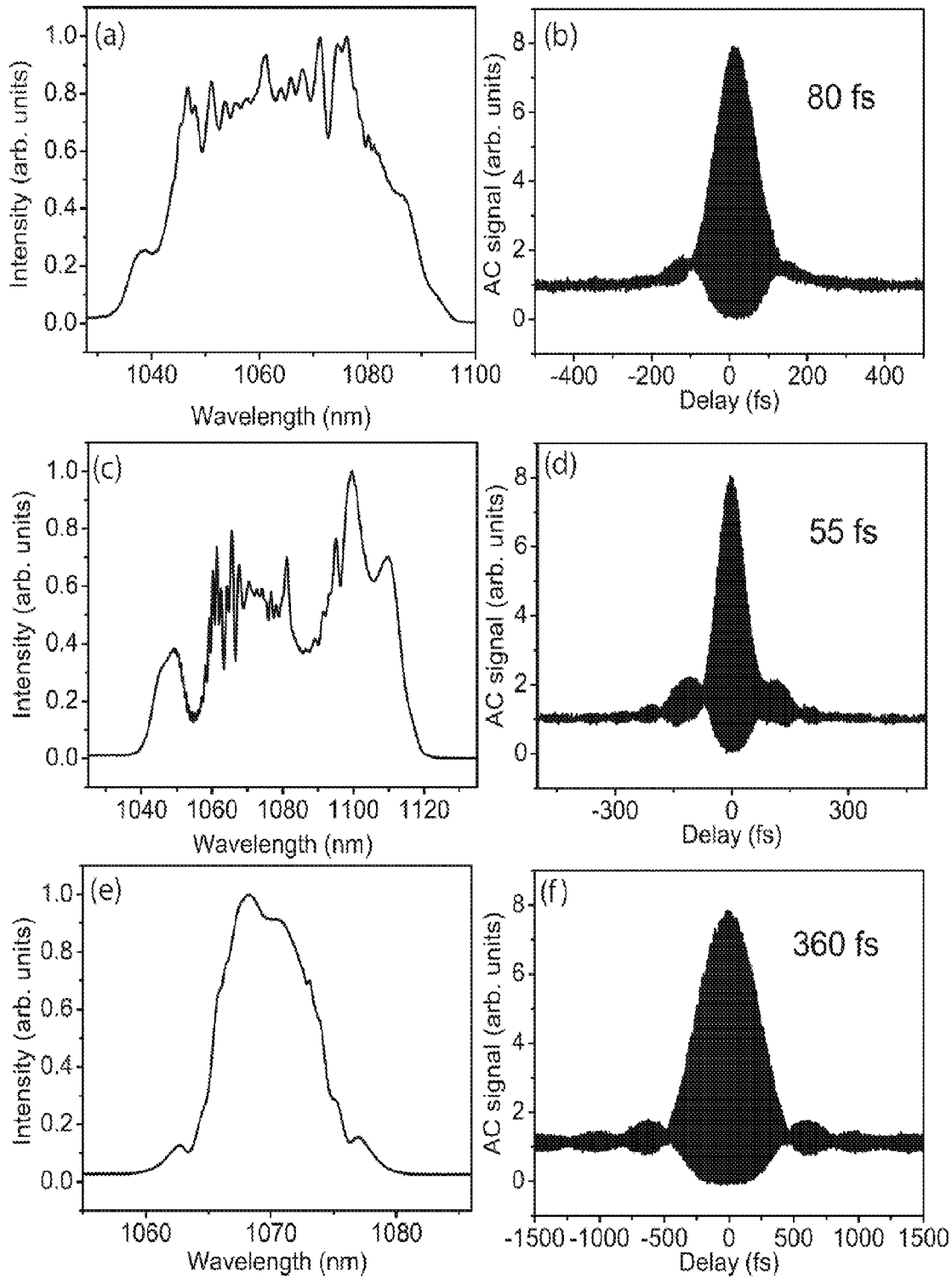
FIG. 6 shows an output spectrum and dechirped autocorrelation for modes with (a,b) large spectral breathing, (c,d) short pulse duration, and (e,f) long cavities.

In contrast to prior pulsed lasers, the local attraction of the pulse to the amplifier similariton solution decouples the output pulse from other elements of the ring laser cavity. This property allows a variety of pulse evolutions and performance parameters. For example, with a narrower (2 nm) spectral filter, the pulse can evolve to an amplifier similariton with a large bandwidth. The resulting solution has a large spectral breathing ratio (e.g., about 20), and yields 5-nJ pulses that dechirp to 80 fs [FIG. 6(a,b)].

One limitation to similaritons in fiber amplifiers is the gain bandwidth of the fiber amplifier inside the ring laser cavity. As the spectrum of a laser pulse approaches the gain bandwidth, the chirp is no longer monotonic, which disrupts the self-similar evolution. With larger pump powers the spectral bandwidth increases, but the pulse quality is degraded. For example, with a 4-nm filter a 3-nJ pulse dechirps to 55 fs [FIG. 6(c,d)], a remarkably short pulse considering the large normal GVD of the cavity. Amplifier similariton mode locking is possible even with the addition of long lengths of fiber before the gain. For example, with 63 m of fiber and a 2-nm spectral filter, a 15-nJ pulse that can be dechirped to 360 fs is generated [FIG. 6(e,f)].

Amplifier similaritons undergo strong spectral and temporal breathing in the cavity. The short pulses and smooth spectra of amplifier similariton lasers will be attractive for applications, so it is desirable to determine whether these solutions will be stable at higher energies.

Referring to FIG. 4, the illustrated laser design can be used to construct a double-clad Yb-doped all-normal-dispersion fiber laser with a narrow intra-cavity spectral filter for producing, e.g., 22 nJ pulses at 42.5 MHz repetition rate. These pulses are characterized and compressed via multiphoton intrapulse interference phase scan to as short as 42 fs and 10 nJ/pulse. Adaptive compression underlies the achievement of 250-kW peak power, which enables efficient second and third harmonic generation with spectra spanning 30 nm and 20 nm, respectively. In FIG. 4, the pulse energy is limited by multipulsing. Pulse characterization and adaptive compression are achieved using multiphoton intrapulse interference phase scan (MIIPS). Following compression, pulses as short as 42 fs are obtained, with the peak power of approximately 250 kW. To our best knowledge, this may be among the shortest pulse durations reported to date for an Yb fiber laser without any intra-cavity dispersion compensation. This system can also be used to produce high peak power from a fiber laser without the use of LMA fiber. Second and third harmonic generation spectra obtained when using the output of this high order dispersion corrected fiber laser are the evidence of the high peak power and proper pulse compression. This type of lasers can have useful applications in nonlinear optical applications, such as multi-photon imaging.

In FIG. 4, the ring laser cavity is based on a SMF with 10-μm core diameter. The larger core should allow high maximum pulse energy, while retaining the practical features of standard fiber. The intra-cavity spectral filter is formed by the combination of a grating and a collimator. Here, the collimator connected to SMF-I is about 13 cm away from the grating (300 groves per millimeter) and acts as a ~3 nm spectral filter. It is aligned to couple the 1st order diffraction beam from the grating back into the laser cavity. Only a small amount of the 1st order beam couples into the 10 μm core diameter fiber as illustrated in FIG. 4. Following the collimator, there is 1.7 m long 10 μm/125 μm single mode passive fiber (SMF-I) including the extension fiber of the collimator and combiner. A 0.35 m long section of single mode passive fiber (SMF-II) follows the gain fiber. The ends of the 2.5 m Yb doped double-clad gain fiber (CorActive DCF-YB-10/128) are spliced to SMF-I and SMF-II, respectively. The gain fiber is pumped by a CW diode laser at 976 nm. The polarizing beam splitter (PBS) 150, isolator, and waveplates (half- and quarter-waveplate on the left side, quarter-waveplate on the right side in FIG. 4) act as an artificial saturable absorber, due to the nonlinear polarization evolution of the laser pulse propagating through the fiber. By adjusting these waveplates, passive mode-locking can be achieved. The half-waveplate preceding the grating helps to maximize the efficiency of the 1st order diffraction. The 0th order diffraction beam is directed onto a photodiode, connected to an oscilloscope and Radio Frequency (RF) spectrum analyzer.

The PBS acts as the output coupler. The output spectrum is measured by an Optical Spectrum Analyzer (OSA, HP70451). A flip mirror near the output is used to direct the beam into the MIIPS-enabled pulse shaper (MIIPS Box 640, Biophotonic Solutions Inc.). Before entering the shaper, the beam is expanded by a 3× telescope. The output of the pulse shaper is focused on a 10 μm BBO crystal by lens L1. The resulting SHG signal is detected by a fiber-coupled spectrometer (Ocean Optics USB4000). The MIIPS software measures the spectral phase of the pulses at the nonlinear crystal and adaptively compensates high order dispersion to obtain transform limited pulses. A number of tests and shaper-assisted interferometric autocorrelation are performed to ensure that the obtained results are consistent with independent theoretical calculations.

Figure 7:
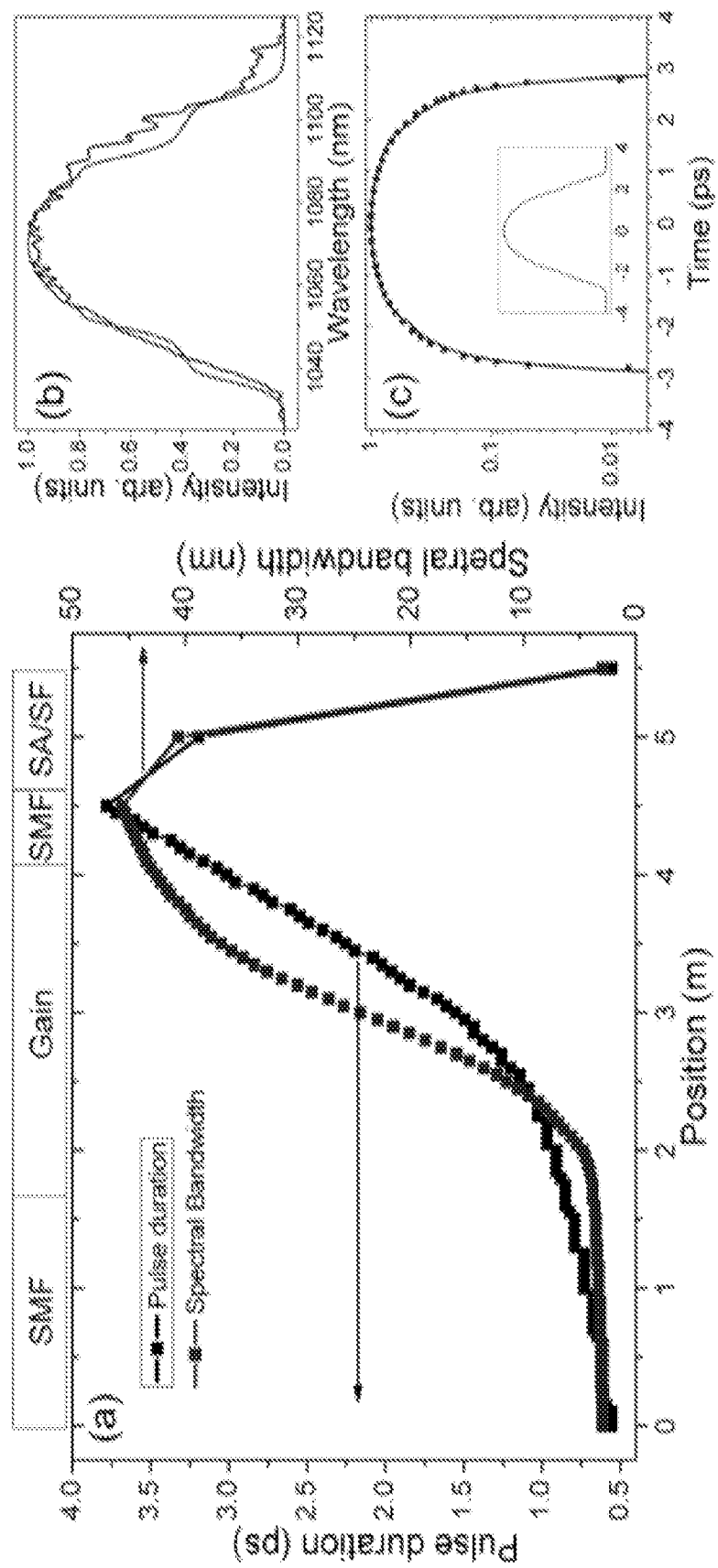
FIG. 7 shows numerical simulation results. (a) Evolution of pulse duration (black) and spectral bandwidth (red) through the laser cavity. SA: saturable absorber; SF: spectral filter. (b) Comparison of the spectrum at the end of the 2nd SMF (red) and the spectrum of the 0th order diffraction from the intra-cavity grating (black). (c) The pulse temporal profile at the end of the 2nd SMF in log-10 scales (black line) and parabolic fit (red dots). Insert: the same pulse temporal profile in linear scale.

To verify the presence of amplifier similaritons in the cavity, numerical simulation based on the non-linear Schröd- inger equation using split-step Fourier method are performed with the actual fiber parameters. An instantaneous saturable absorber is used, corresponding to the nonlinear polarization evolution. Group-velocity dispersion $\beta_2$=23 fs$^2$/mm and nonlinearity coefficient $\gamma$=0.0016 (W m)$^{-1}$ are used. Starting from white noise, a stable solution of 23 nJ pulse energy is obtained with a 3 nm intra-cavity spectral filter [FIG. 7]. The pulses experience both large temporal and spectral breathing in the gain segment. The saturable absorber and spectral filter shape the pulse and make it self-consistent over the cavity round-trip. The spectral breathing ratio is up to 15 throughout the cavity. Comparison between the simulated laser spectrum at the end of the second SMF and the spectrum experimentally taken from the 0th order diffraction of the intra-cavity grating shows a good match [FIG. 7(b)]. The simulated pulses at the end of 2nd SMF also show very good fit to the parabolic profile in time domain [FIG. 7(c)], which is a key characteristic of amplifier similaritons.

Figure 8:
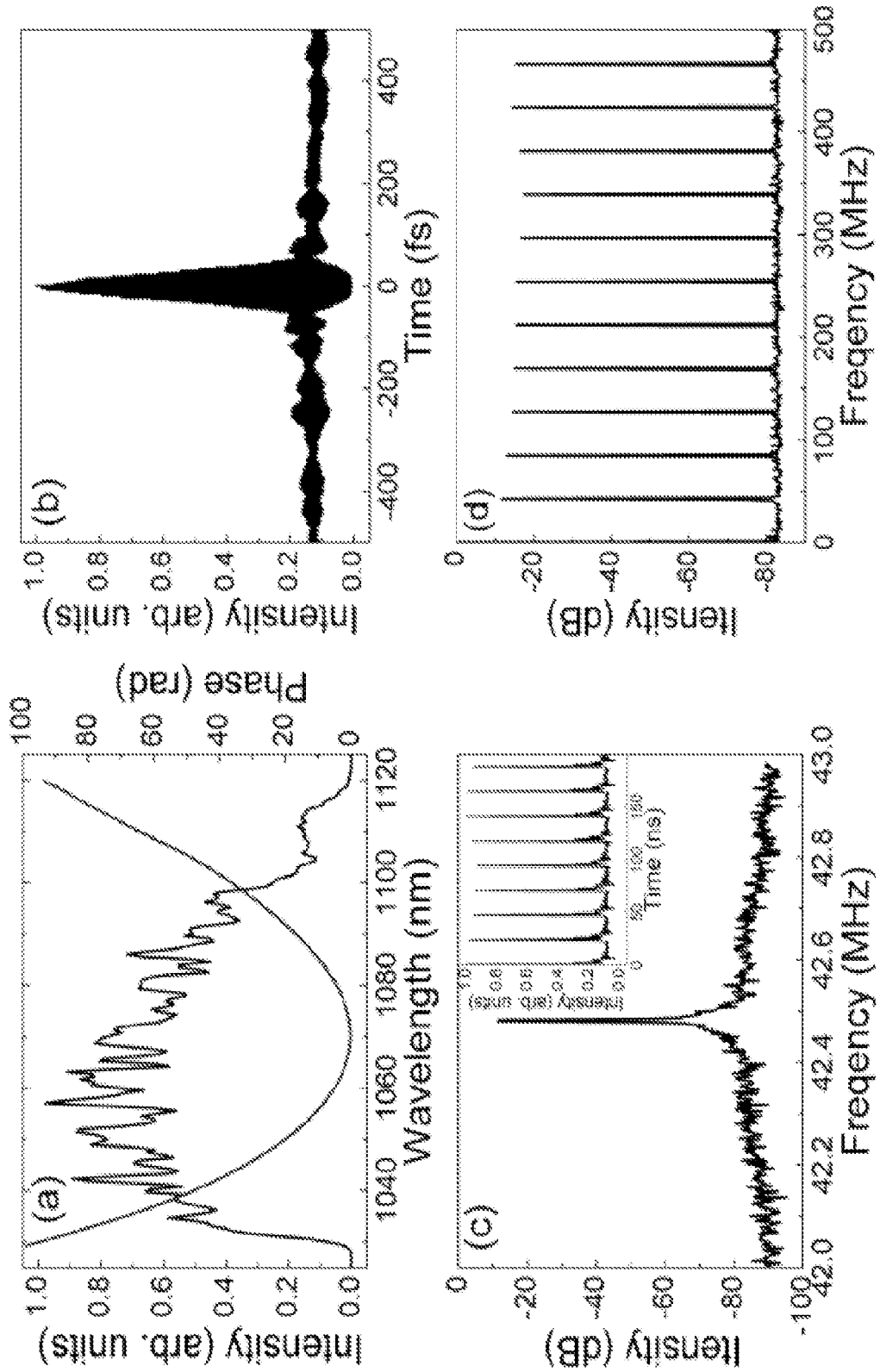
FIG. 8 shows (a) Output laser spectrum (black) and measured phase of the output pulses (red). (b) Experimental interferometric autocorrelation, AC FWHM 57 fs. (c) RF spectrum analyzer result, 1 MHz frequency span. Insert: pulse train form oscilloscope. Repetition rate 42.5 MHz, energy per pulse 21.9 nJ. (d) RF spectrum analyzer result, 500 MHz span.

The performance parameters of the laser are summarized in FIG. 8. Various mode-locked states are possible depending on the diode laser pump power and the orientation of the wave plates. For example, when the pumping power is set at 4.1 W, a stable mode-locked state with an average output power of 930 mW is obtained [FIG. 8(a)], corresponding to 21.9 nJ pulses emitted at 42.5 MHz in repetition rate [FIG. 8(c)]. When the output pulses are compressed to their transform limit, interferometric measurements are performed, resulting in the full-width-half-maximum (FWHM) of 57 fs [FIG. 8(b)]. Based on Fourier transform of the experimental laser spectrum and autocorrelation simulations using commercial "FemtoPulse Master" software (Biophotonic Solutions Inc.), the deconvolution factor should be 1.37. This factor are used to determine the experimental FWHM duration of 41.6 fs for the compressed pulses.

The output pulse train is monitored by a fast photodiode on the oscilloscope and examined using the RF spectrum analyzer. For example, with a 1 MHz frequency span, the RF spectrum analyzer gives a single peak at 42.48 MHz with ~70 dB signal-to-background ratio [FIG. 8(c)]. The inset in FIG. 8(c) shows the response from a fast photodiode confirming single-pulse operation. No sidebands are observed for the fundamental and higher harmonics over the 500 MHz span [FIG. 8(d)], which confirms stable mode-locking.

Pulse dispersion measurement and compression are accomplished using the pulse shaper. The MIIPS software scans a sinusoidal spectral phase function across the spectrum of the pulse, collects the resulting SHG spectra and derives the corresponding spectral phase distortion. Typically, multiple iterations (e.g., seven iterations) are run for the measurements presented here in order to obtain compensation within 99.7% of the theoretical transform limit, defined by the input laser spectrum. The phase function required to achieve transform limited pulses is the complementary phase obtained after double integration of the shaper-measured second-derivative.

To account for phase distortions due to optics in the pulse shaper and thereby measure the pulse phase directly at the laser output, we independently measured the phase distortions due to the pulse shaper itself by putting it in line with another pulse shaper. The measured phase at the laser output pulses is shown in FIG. 8(a). Polynomial fitting up to the third order gives ~35,000 fs$^2$ of the second order dispersion (SOD) and ~166,000 fs$^3$ of the third order dispersion (TOD). Note that the observed SOD is much less than the cavity dispersion of ~100,000 fs$^2$, calculated based on the total fiber length and the fiber group-velocity dispersion $\beta_2$=23 fs$^2$/mm. This is one of the characteristic signatures of the similariton formation in the gain medium.

Figure 9:
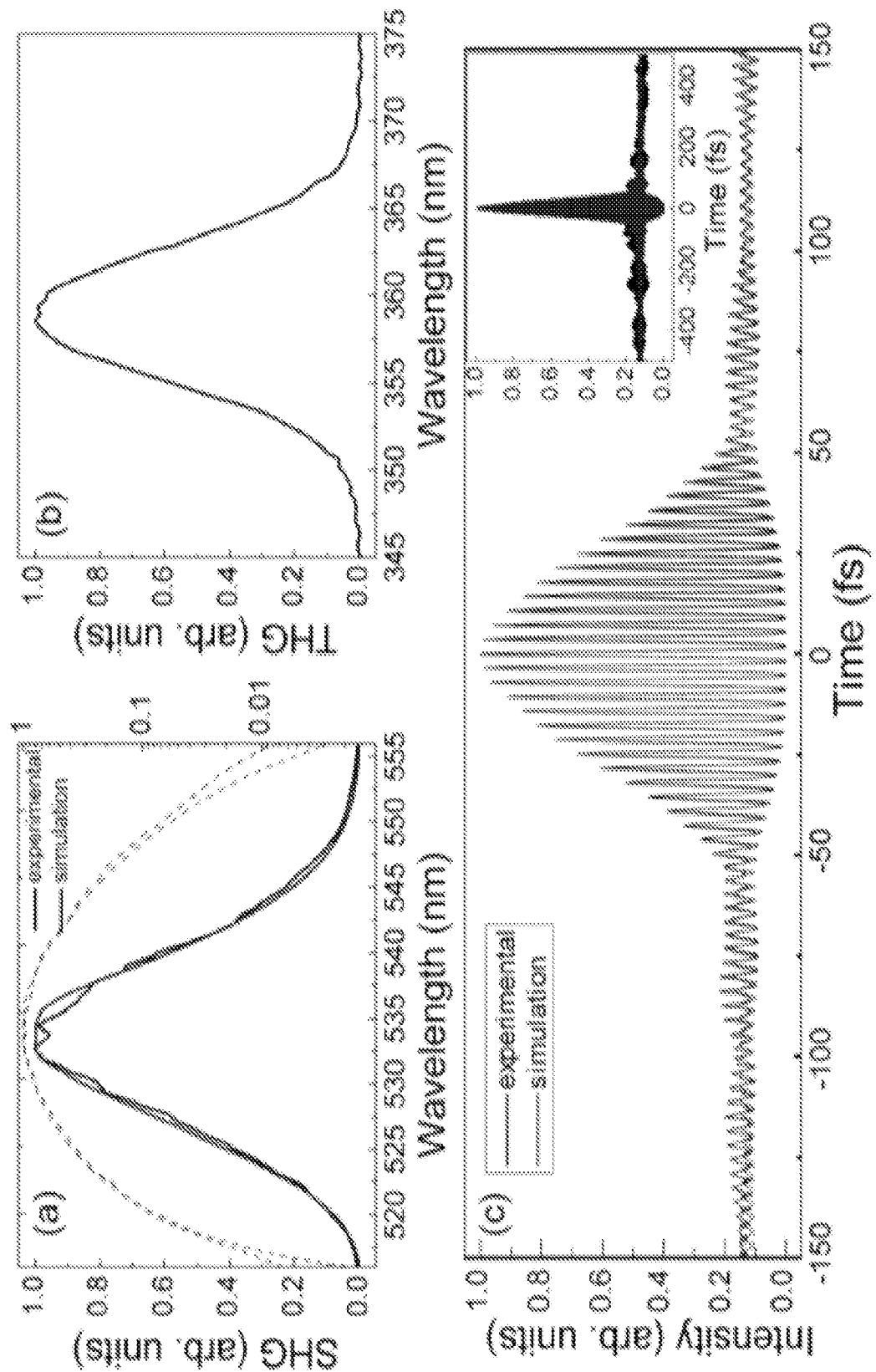
FIG. 9 shows (a) Experimental and calculated SHG spectra shown in linear (solid line) and log-10 (dash line) scales. (b) Experimental THG spectrum obtained by focusing TL pulses at the surface of a glass slide. (c) Experimental and calculated interferometric autocorrelation traces for compressed laser pulses on the range of −150 fs to 150 fs. Insert: Same data on the range of −500 fs to 500 fs.

After the pulse compression, the pulse shaper has been used to create two pulse replica and scan one of them in time to obtain interferometric autocorrelations. The measurements show excellent agreement with calculations using FemtoPulse Master software [FIG. 9(c)]. Similarly, we have also compared the experimental SHG spectrum for compressed laser pulses with the calculated SHG spectrum based on the measured fundamental spectrum of the laser and a flat spectral phase [FIG. 9(a)]. Excellent agreement between theoretical and experimental results for both linear and logarithmic scales gives us confidence in the measured parameters and that the laser pulses at the BBO crystal are transform limited.

Taking into account the throughput of our pulse shaper (~50% due to the reflection efficiency of the grating and mirrors), we calculate the peak power for compressed pulses to be about 250 kW. This peak power is sufficient to obtain third harmonic generation (THG) signal at the interface of air and glass, see FIG. 9(b). For these measurements, the output from the pulse shaper is first focused via a 10× objective on a BBO crystal. Then the pulses are compressed at the objective focus. Once pulse compression is achieved, the BBO crystal is replaced by a 1-mm-thick glass slide. The observed THG spectrum spans ~20 nm bottom-to-bottom. The broad THG spectrum indicates that the third order dispersion is fully corrected. It is necessary to point out that, higher peak power can be obtained by improving the throughput efficiency of the pulse shaper.

We have also observed that for a fixed filter bandwidth, the spectral breathing ratio through the cavity is proportional to the pump power. When the pump power is increased over 4.1 W, the output laser spectrum continues to broaden but is no longer stable and fully coherent. Only partial pulse compression has been achieved and the resulting SHG signal is observed to be much weaker than when the output is fully coherent. When the pump power is reduced to 3.85 W, the output laser spectrum becomes narrower. Under these conditions, pulses with FWHM duration of 44.4 fs have been obtained with the average output power of 850 mW. The pulse duration increases to 57 fs with pumper power of 3.1 W.

The filter bandwidth, a key factor of the laser cavity, affects the laser performance. When the collimator is moved closer to the grating to increase the bandwidth of the spectral filter bandwidth, e.g., increasing to ~4 nm, the compressed pulses as short as 52 fs are obtained. A birefringent spectral filter of 12 nm bandwidth has also been used as the filter 130. With this larger bandwidth filter, output spectra with steep edges and "cat-ears" are obtained, which are the characteristics of dissipative soliton pulses. The output pulses are compressed to 80 fs.

According to numerical simulations, the transition from dissipative soliton to amplifier-similariton happens when the filter bandwidth is reduced below ~6 nm. The simulation results are in agreement with experimental results for several filter bandwidth conditions.

A systematic study of the amplifier similariton laser will be needed to determine the limits on the pulse energy. Considering that the energy was not maximized, the 7-fold increase in pulse energy that we find is in rough agreement with the 3-fold increase that would be expected based on the fiber core areas difference alone. The experimental results presented here can be viewed as initial experimental data in the effort to determine the maximum performance of these lasers.

In mode-locking, the bandwidth of ultrashort pulses from a laser is determined primarily by the spectrum of the gain medium. Lasers with self-similar evolution of the pulse in the gain medium can tolerate strong spectral breathing, which is stabilized by nonlinear attraction to the parabolic self-similar pulse. Here we show that this property can be exploited in a fiber laser to eliminate the gain-bandwidth limitation to the pulse duration. Broad spectra (e.g., about 200 nm) are generated through passive nonlinear propagation in a normal-dispersion laser, and these can be dechirped to about 20-fs duration.

A critical factor in the design of an ultrashort-pulse laser is the bandwidth of the gain medium. Almost all lasers that generate few-cycle (~10 fs) pulses exploit the large ($2\pi \times 44$ rad THz) gain bandwidth of titanium-doped sapphire. Spectra that exceed the gain bandwidth, and pulses that approach a single cycle in duration, have been generated through nonlinear spectral broadening and preferential output coupling of the edges of the spectrum. Much of our understanding of mode-locked lasers comes from analytic solutions of equations based on the assumption of small changes in a pulse as it traverses the cavity. The intracavity pulse evolution in even a 10-fs Ti:sapphire laser is not dramatic, because the crystal comprises roughly one characteristic dispersion length (LD) of propagation: $LD = \tau^2/|\beta 2| \sim 1$ mm, where t is the pulse duration and $\beta 2$ is the second-order dispersion coefficient.

Fiber oscillators have not reached the few-cycle regime. Few-cycle pulses can be generated by pulse compression or by interfering the spectra of two separate continua seeded by a fiber laser. Direct generation from an oscillator should impact applications by improving the stability, and reducing the complexity and cost of the source. Applications would include generation of seed pulses for attosecond science, frequency metrology, and nonlinear microscopy, among others.

The gain bandwidth of various ytterbium-doped silica fiber gain materials is about one-quarter that of Ti:sapphire. Significant gain in such fiber gain materials typically extends over a spectral bandwidth of about 100 nm to about 150 nm, with the short-wavelength limit of the gain determined by the pump absorption band. The cut-off wavelength, below which the fiber supports multiple transverse modes, may present an ultimate limitation to the bandwidth of a fiber laser: even small higher-order-mode content significantly reduces the multipulsing threshold of modelocked fiber lasers. Single-mode fiber (SMF) designed to operate near 1 µm typically has a cut-off wavelength near 900 nm. Modelocked Yb fiber lasers produce bandwidths up to ~120 nm at the −20-dB points, and pulses as short as ~30 fs. Broader output spectra can be produced with noise bursts, which are not self-consistent solutions of the laser cavity. Thus, the limited gain bandwidth of the fiber gain material can present a clear challenge to the generation of short laser pulses, e.g., 10-fs pulses. In many fiber laser designs, a fiber laser typically includes around 1 m of fiber. LD~2 mm for a 10-fs pulse, so a 10-fs fiber laser tend to include hundreds of dispersion lengths. The pulse evolution in such a laser will likely involve extreme spectral and temporal changes. Whether such dramatic evolution can be controlled is an important question.

Fiber laser designs described below decouple the pulse bandwidth from the limitations of the gain spectrum of a fiber laser. In a resonator with large normal dispersion, spectral broadening in fiber after the gain segment produces output bandwidths that substantially exceed the gain bandwidth. The overall evolution is stabilized by filtering and the nonlinear attraction to the self-similar solution in the gain medium. Bandwidths approaching 200 nm and pulses as short as 21 fs (the shortest from a fiber laser to date) are generated in initial experiments. This demonstration introduces a class of fiber lasers with clear potential for few-cycle pulse generation, and more broadly for producing a range of useful output pulses. In contrast to prior work aimed at generation of the shortest pulses, this approach cannot be understood within averaged-cavity models.

In short-pulse lasers based on self-similar pulse propagation in their gain segments, spectral breathing occurs and the bandwidth varies by an order of magnitude as the pulse traverses the resonator. Strong filtering stabilizes the evolution by allowing a short pulse to evolve to the parabolic solution before the end of the gain fiber. The similariton is a local nonlinear attractor in the gain segment of the laser. The pulse can change dramatically, or it can be intentionally manipulated, in the rest of the cavity, as long as the input to the amplifier can approach the asymptotic solution. This property of the amplifier similariton evolution will be a valuable degree of freedom in the design of high-performance instruments.

The spectral bandwidth of a similariton grows exponentially in an amplifier. However, the self-similar evolution is disrupted when the pulse bandwidth approaches the gain bandwidth of the amplifier, and this limits the pulse energy and duration that can be achieved. Generation of pulses shorter than 30-40 fs from a self-similar amplifier based on Yb fiber may be difficult. Spectral broadening in a similariton-soliton laser may be limited by soliton fission in the anomalous-dispersion segment. It may be possible to extend or continue self-similar pulse evolution beyond an amplifier. For example, a fiber with lower dispersion and/or higher nonlinear coefficient than the gain fiber can induce substantial spectral broadening. The linearly-chirped parabolic pulse produced by the amplifier will maintain close to a parabolic shape and linear chirp in the passive fiber.

Figure 10:
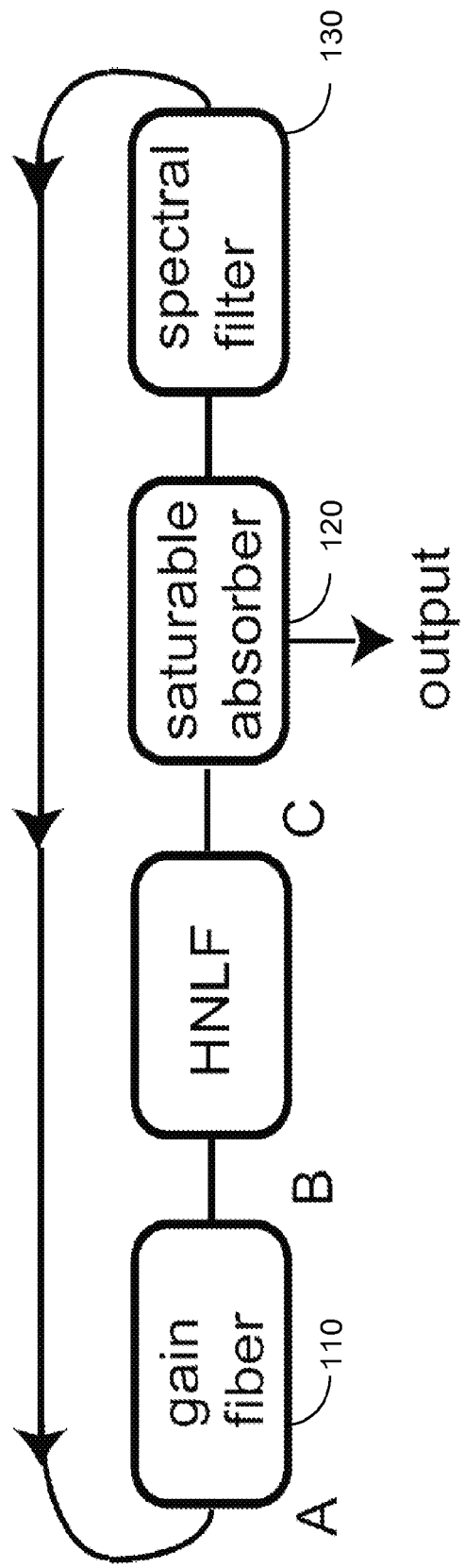
FIG. 10 shows an example of a laser design.

FIG. 10 shows a laser device based on FIG. 1B where a highly nonlinear fiber (HNLF) is provided inside the laser cavity as an intra-cavity spectral broadening fiber segment. This device is used to evaluate whether the evolution will develop from noise with feedback. The simulated cavity (shown conceptually in FIG. 10 and with experimental detail in FIG. 11) contains 30 cm of SMF ($\beta 2 = 230$ fs$^2$/cm), 80 cm of Yb-doped gain fiber (gain coefficient=6.8/m), and another 20 cm of SMF. Higher-order dispersion is neglected. The gain fiber and SMF have a nonlinear coefficient of $4.5 \times 10^{-4}$/(Wm). It is assumed that 35% of the light is coupled into a segment of passive fiber with parameters (given below) that correspond to a highly-nonlinear photonic-crystal fiber (PCF) with normal dispersion. After the passive fiber, 80% of the energy is coupled out, and the remaining 20% traverses a saturable absorber and a Gaussian filter with 3-nm bandwidth. Without the PCF, the laser is an established self-similar laser. Simulations based on the standard split-step algorithm were performed for varying parameters of the PCF. The initial field was taken to be white noise.

Figure 12:
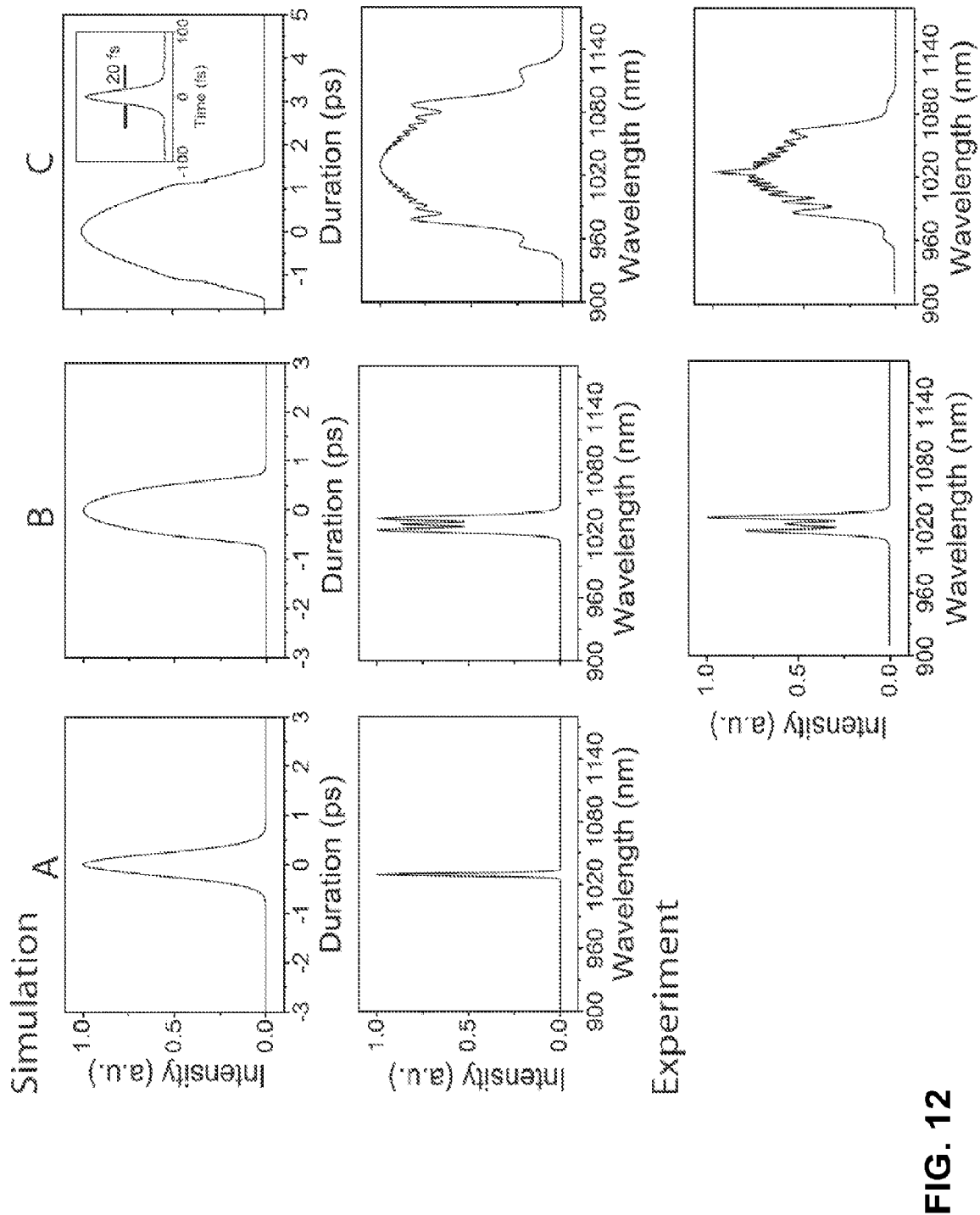
FIG. 12 shows a comparison of simulation to experiment at the indicated locations in the cavity. Simulations assume 2-m length of PCF with $\beta 2=70$ $fs^2/cm$ and nonlinear coefficient 9 times larger than that of the gain fiber. Top row: simulated chirped pulses. The inset is the numerical transform-limited pulse from location C. Middle row: simulated spectra. Bottom row: experimental spectra.

The simulations converge for wide ranges of parameters, and exhibit the desired evolution for narrower but reasonable ranges of the parameters of the PCF: mode-field diameters between 2.2 and 2.8 µm, dispersion coefficient from 40 to 130 fs$^2$/cm, and lengths from 1.5 to 3 m. The broadest spectra are generated for PCF lengths between 1.6 and 2 m, with results for 2 m shown in FIG. 12. The narrow Gaussian spectrum produced by the filter broadens and develops the structure characteristic of a chirped parabolic pulse (FIG. 12, middle row). A parabolic temporal profile is clearly established in the gain fiber (top row of FIG. 12). The spectrum broadens further in the passive fiber (FIG. 12, middle row). The pulse energy is 0.6 nJ. Impressing a quadratic spectral phase on the output produces a dechirped pulse that is close to the transform limit. The dechirped pulses are 20-fs long (FIG. 12, top row, inset).

Figure 11:
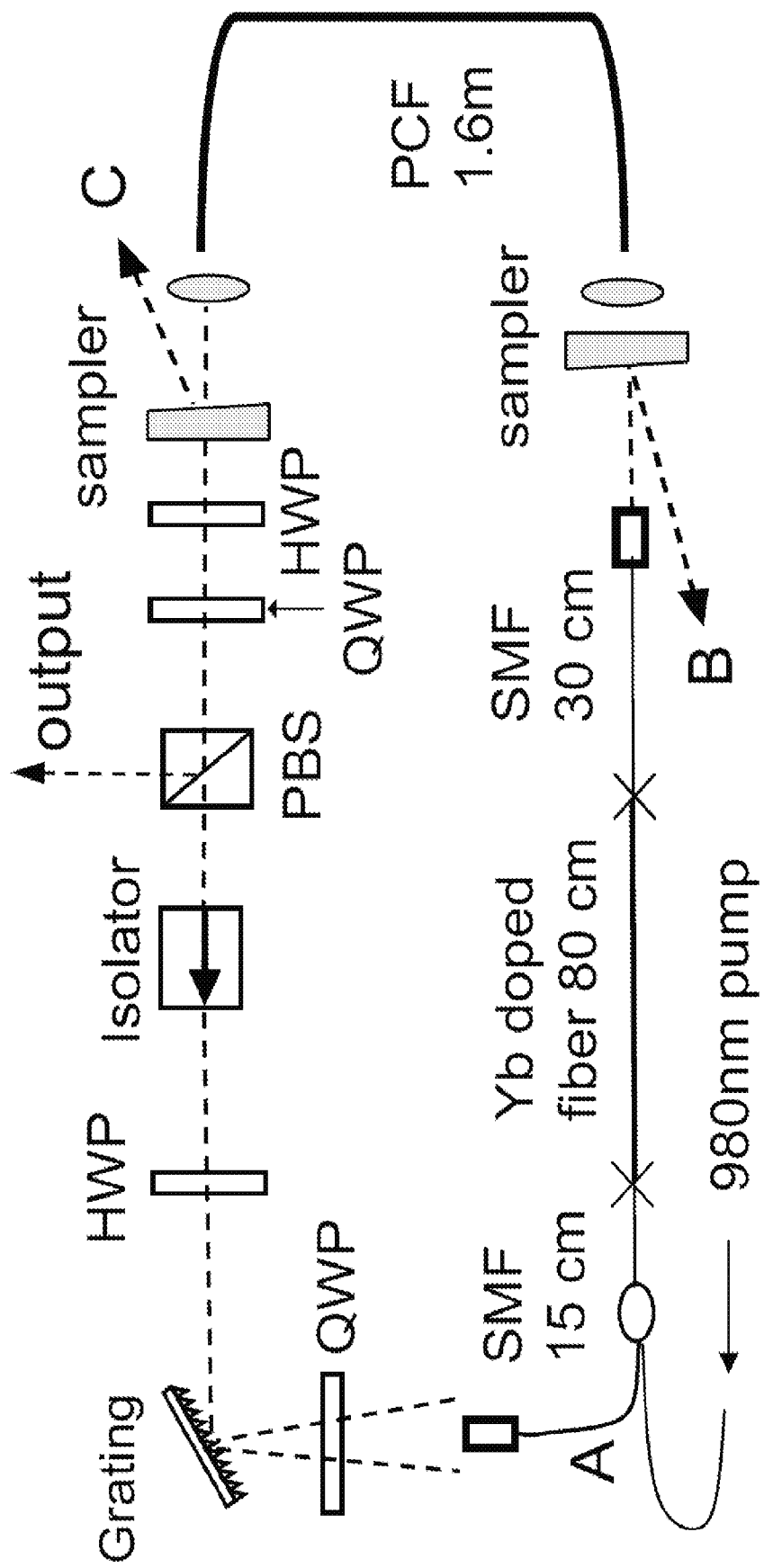
FIG. 11 shows a detailed set-up based on the laser design in FIG. 10.

In FIG. 11, the HNLF in FIG. 10 is implemented by PCF (NL-1050-NEG-1 from NKT Photonics A/S) with 2.2-μm mode-field diameter. The PCF has $\beta 2=130$ $fs^2/cm$ and nonlinear coefficient 9 times larger than that of the gain fiber. A 300l/mm grating and a collimator create a Gaussian spectral filter with 4-nm bandwidth. Nonlinear polarization evolution (NPE) is an effective saturable absorber, implemented by the quarter- and half-wave plates and polarizer. The laser is constructed with some bulk components to facilitate variation of the cavity parameters, and sampling beam-splitters allow monitoring of the intracavity pulse evolution. The pulse-repetition rate is about 60 MHz. Single-pulse operation is verified by monitoring the output with a photodetector and sampling oscilloscope with 30-GHz bandwidth and recording the autocorrelation for delays up to ~100 ps.

Figure 2:
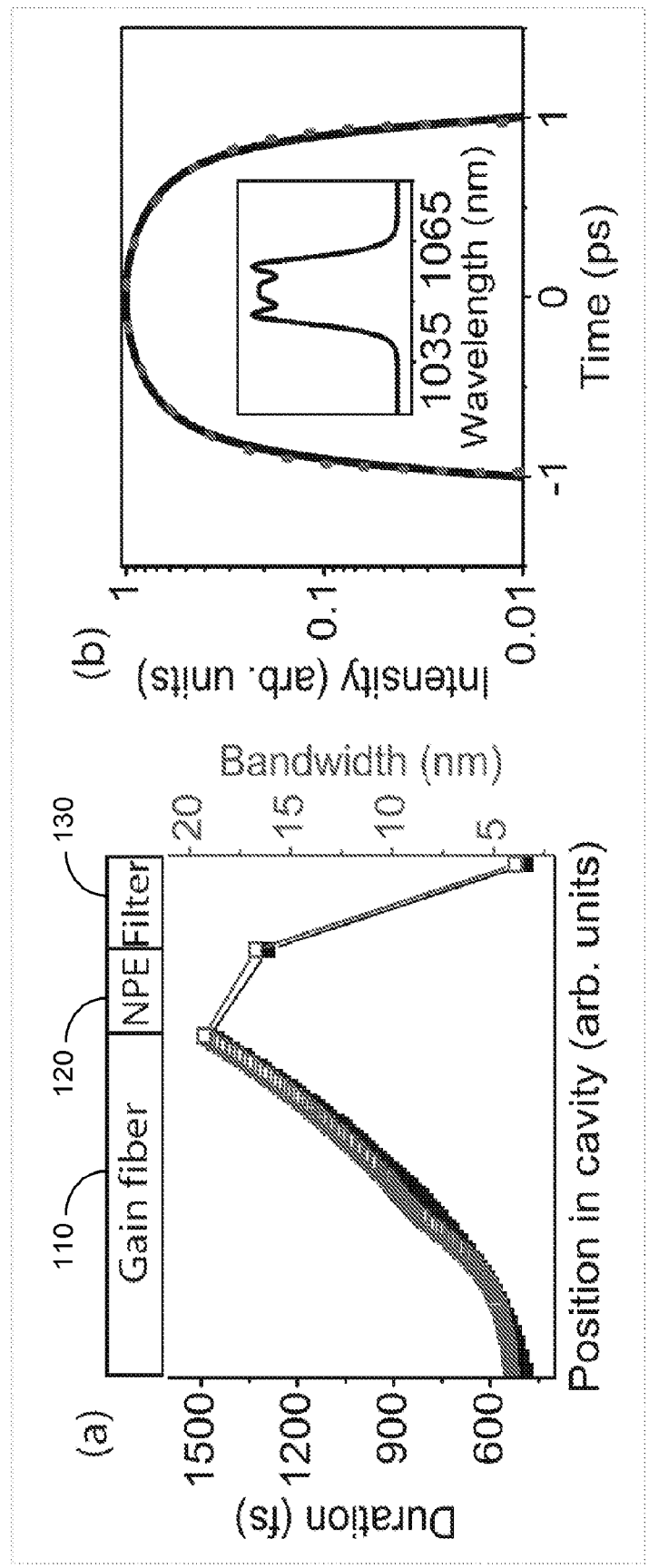
FIG. 2 shows (a) Evolution of the FWHM pulse duration (filled) and spectral bandwidth (open) in the cavity. The components of the laser are shown above the graphs. (b) The output pulse at the end of the gain fiber (solid) and a parabolic pulse with the same energy and peak power (dotted). Inset: spectrum. The orthogonally polarized pulse and spectrum (not shown) are essentially identical.

The laser is mode-locked by adjusting the wave plates. Mode-locked operation occurs with segments of PCF between 1.5 and 3 m long, as predicted by the simulations, with the broadest spectra produced with 1.6 to 1.7 m of PCF. The bottom row of FIG. 12 shows the spectra recorded at the indicated points of the cavity, for 1.55 m of PCF. After the gain segment, the spectrum has the structure of a chirped parabolic pulse. The 30-nm bandwidth of the pulse from the gain segment increases dramatically in the PCF. The fullwidth at half-maximum bandwidth is 100 nm, which exceeds the gain bandwidth. The spectrum exhibits all of the qualitative features of the simulation result, along with a continuous-wave peak near 1025 nm that is difficult to avoid. The simulated spectra in the middle row of FIG. 1A2 were obtained assuming a passive fiber with the nonlinear coefficient of the PCF and $\beta 2=70$ $fs^2/cm$, which is half the nominal value of the PCF. Considering the uncertainties in the parameters of the PCF and the sensitivity of selfsimilar lasers to all cavity parameters, we consider this reasonable agreement. The pedestals at the base of the spectrum are a signature of incipient wave-breaking, which is also visible in the simulated temporal profile (FIG. 1A2, top row, point C).

Figure 13:
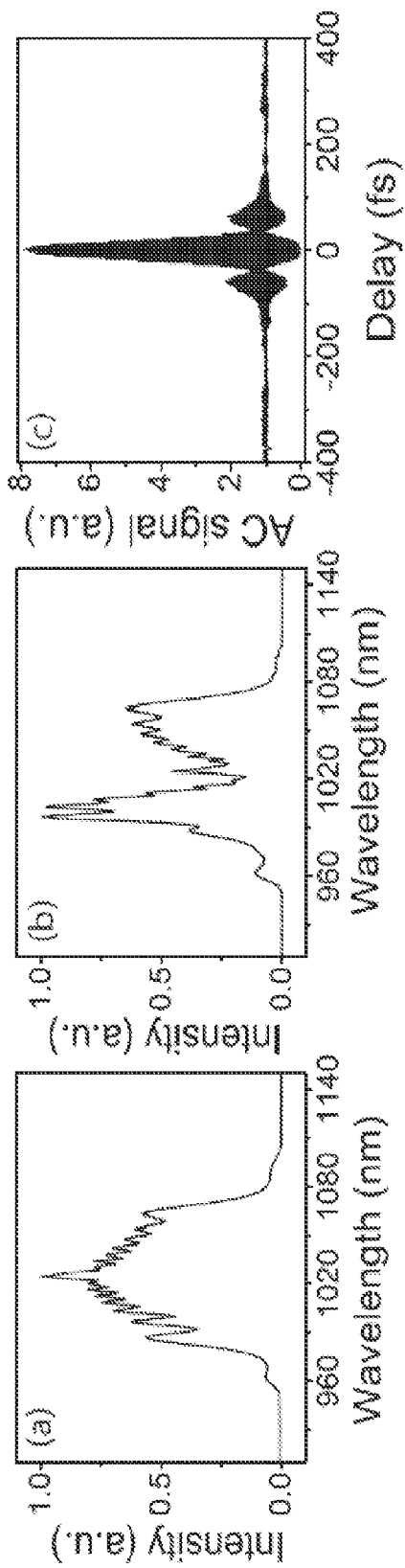
FIG. 13 shows experimental (a) spectrum after the PCF, (b) output spectrum, and (c) output autocorrelation signal after phase correction by MIIPS for a 25-fs pulse.

The chirped output pulse energy is 1 nJ. The energy is limited by the available pump power, but simulations show multi-pulsing at 2 nJ, so we do not expect much higher energies. The output spectrum (FIG. 13(b)) maintains the overall bandwidth, but typically exhibits some modulation, and may become asymmetric. Some spectral structure can be expected to arise from the NPE process. Birefringence of the PCF may play a role, but that remains to be assessed carefully. We used multiphoton intrapulse interference phase scan (MIIPS) to characterize the phase of the output pulse. The quadratic, cubic, and quartic phases are typically 12,000 $fs^2$, $-6\times 10^4$ $fs^3$, and $2\times 10^6$ $fs^4$, respectively. The quadratic phase is smaller than the cavity dispersion, which is typical for amplifier-similariton lasers. The sign and magnitude of the cubic and quartic phases are consistent with the third- and fourth-order dispersion of the PCF.

This suggests that the residual phase is accumulated in the PCF without disrupting the intended propagation. After phase correction by MIIPS the pulse is dechirped to the transform limit, with a full-width at half-maximum (FWHM) duration of 25 fs (FIG. 13(c)). The pulse energy after dechirping by the MIIPS apparatus is 0.5 nJ. A consequence of the structured output spectrum is that about 20% of the energy is in the secondary structure. Although the CW peak is undesirable, it does not seem to have major impact on the pulse quality nor the stability of the laser. The pulses could be dechirped with a standard grating compressor with the use of a PCF with smaller third- or fourth-order dispersion. However, the MIIPS system allows adaptive compensation of any subsequent optics.

Figure 14:
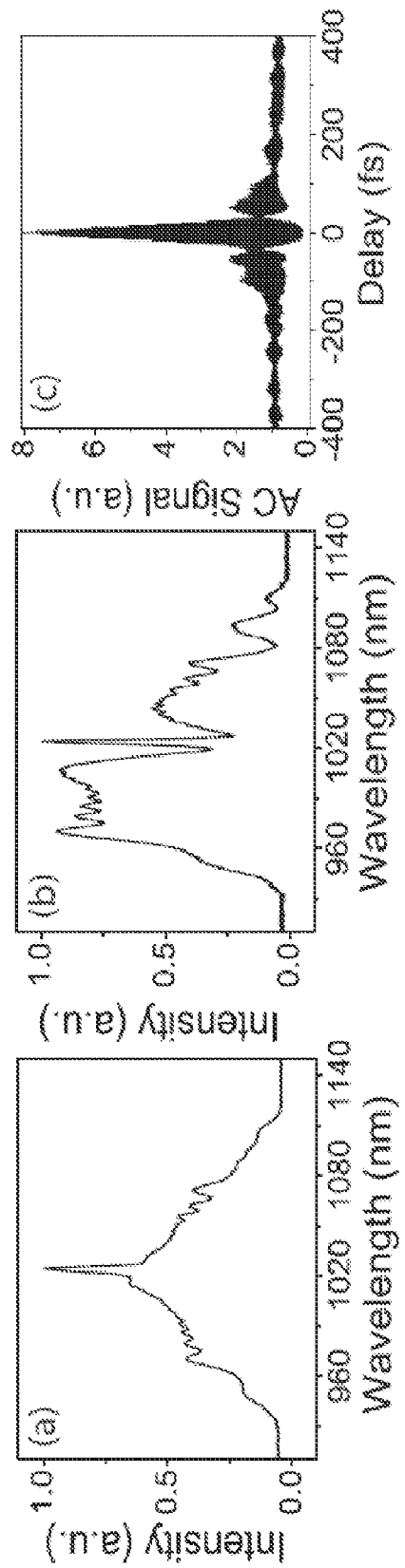
FIG. 14 shows an experimental (a) spectrum after the PCF, (b) output spectrum, and (c) output autocorrelation signal after phase correction by MIIPS for a 21-fs pulse.

An example of the broadest spectra that we have observed is shown in FIG. 14. A 1.6-m segment of the PCF was used to obtain this result. Significant energy extends over nearly 200 nm at the base of the spectrum. The pulse energy is 1 nJ. The production of spectra with ~20% of the energy below the pump wavelength (where there is no gain) and the excellent agreement between calculated and measured spectra demonstrate that the Yb gain bandwidth does not limit the output spectrum. The FWHM pulse duration is 21 fs, which corresponds to 6 cycles of the field. The pulse does have significant structure in the wings, with energy extending beyond 100 fs from the peak.

The pulse evolution in this laser exhibits some remarkable aspects. The spectrum broadens from 4 to 30 nm in the gain fiber, and then to 110 nm in the passive fiber, for an overall spectral breathing ratio of 27. The intracavity pulse duration varies between 1 and 10 ps, yet the pulse can be dechirped outside the cavity to ~20 fs. With respect to that pulse duration, the laser is equivalent to 300 dispersion lengths of propagation. For comparison, in a 5-fs Ti:sapphire laser the spectrum exceeds the gain bandwidth by ~30%, the spectral breathing is less than a factor of 2, and the intracavity pulse duration varies from 10 to 50 fs.

The results presented here show that substantial bandwidth enhancement by nonlinear pulse propagation can be stabilized in a self-similar laser. Systematic studies of the behavior of the laser with varying parameters should be performed. We have not identified the factors that limit the operation or performance of this kind of laser. We do observe indications of wave-breaking (as in FIG. 12) near the boundaries of convergence of the simulations. The simulations neglect higher-order dispersion, so this suggests that the higher-order dispersion does not limit the stability of the laser. The influence of higher-order dispersion of the nonlinear segment on the generated pulse should be studied, however. It should be possible to produce pulses with morelinear chirp by better design of the nonlinear segment. The existence of the CW component, and its influence on the mode-locked state, also need further investigation. We conjecture that the CW solution of the average cavity model can co-exist with the desired self-similar solution. The PCF has a cut-off wavelength around 300 nm, so extremely broad spectra can be accommodated without risk of multimode propagation. With broader spectra, the loss from filtering will present a challenge.

This design of using a spectral broadening fiber segment at the output of the fiber gain section in a fiber ring laser without bandwidth limitations can also be implemented by using a dispersion decreasing fiber, where the resulting system is formally equivalent to a gain fiber. In addition to the potential of unbounded bandwidth, the pulse generated by such a fiber laser can be closer to a parabola and therefore have a nearly-linear chirp. Indeed, initial numerical simulations show that the use of a dispersion-decreasing fiber should allow the generation of broader and less-structured spectra, with smaller higher-order phase to be corrected. Parabolic pulses generated in dispersion-decreasing fiber have a dispersion that varies over kilometers. Hence a fiber with the dispersion varying on the scale of meters can be desirable.

Therefore, the gain bandwidth does not present a fundamental limitation to the minimum pulse duration in an amplifier-similariton laser. The spectrum can be broadened in a separate nonlinear segment, and filtering produces the seed pulse to the amplifier that allows a self-consistent solution. This opens a promising route to the development of few-cycle fiber lasers.

In addition, an amplifier similariton fiber laser with a dispersion map can be constructed. In such a laser, despite large changes in both the magnitude and sign of the total cavity group-velocity dispersion (GVD), the pulse parameters remain nearly constant. A narrow-band spectral filter facilitates the evolution toward the amplifier similariton solution. Strong nonlinear attraction to this asymptotic solution in the amplifier section of the laser underlies the pulse's independence from the global cavity parameters. The freedom from global parameters allows for several scientifically-significant cavity designs which will, in addition, be important for some applications. The dispersion-mapped amplifier similariton (DMAS) laser is a new mode of operation at large anomalous net GVD, which complements the well-known soliton operation. As a practical consideration, the DMAS laser generates shorter pulses with higher energy than soliton operation at large anomalous dispersion. As a consequence, the DMAS laser can eliminate length restrictions when designing oscillators at 1550-nm laser wavelength. In applications, with appropriately-tuned net positive GVD, a DMAS laser can be designed to emit transform-limited pulses. The DMAS laser joins soliton lasers as sources of transform-limited pulses. In the DMAS laser, this occurs at the opposite sign of net GVD, and shorter pulses with greater energy are produced. Furthermore, the master equation, which governs prior mode-locked lasers, predicts an instability near zero GVD when the self-phase modulation exceeds the self-amplitude modulation, as is commonly the case. The DMAS laser, which is not governed by an average-parameter model, does not suffer from the same instabilities, and can be operated at net zero GVD. Because timing jitter is expected to be minimal at net zero GVD, the DMAS laser can provide a route to low-noise frequency combs.

The following sections provide additional technical details on the fiber laser design in FIG. 1B based on HNLF and DDF as specific examples of the spectral broadening fiber segment 160.

Referring back to FIG. 12, numerical simulations were performed to assess the feasibility of the desired evolution. The simulated cavity (shown schematically in FIG. 15a) contains 20 cm of SMF (GVD=230 fs2/cm), 80 cm of Yb-doped gain fiber, and another 30 cm of SMF. In conducted simulations and tests, it is assumed that 40% of the light is coupled into a 2-m segment of passive fiber with GVD=140 fs2/cm), and a highly nonlinear fiber (HNLF) segment with a nonlinear coefficient 9 times larger than that of the gain fiber. These parameters correspond to a photonic-crystal fiber (PCF). After the passive fiber, 60% of the energy is coupled out, and the remaining 40% traverses a saturable absorber and a Gaussian filter with 3-nm bandwidth.

Converged simulations exhibit the desired pulse evolution. Starting from a narrow Gaussian (FIG. 15b-A), the spectrum broadens and develops the structure characteristic of a chirped parabolic pulse (FIG. 15b-B). A parabolic temporal profile is clearly established in the gain fiber (FIG. 15c-B). The spectrum broadens further in the passive fiber (FIG. 15b-D) Impressing a quadratic spectral phase on the output produces a dechirped pulse that deviates from the transform limit by about 5%. The 0.6-nJ dechirped pulses have a duration 20 fs (FIG. 15d), or 6 optical cycles.

FIG. 15A shows an implementation of the laser design. In implementation of FIG. 15A, a PCF segment with 2.2-µm mode-field diameter and the non-linear and dispersion parameters assumed in the simulations were used. The corresponding parts in FIG. 11 and FIG. 15a are labeled by "A", "B", "C" and "D". A 300 1/mm grating and a fiber-pigtailed collimator create a Gaussian spectral filter with 4-nm bandwidth. Non-linear polarization evolution (NPE) is an effective saturable absorber, implemented by the quarter- and half-wave plates. The laser of this example was constructed with some bulk components to facilitate variation of the cavity parameters, and sampling beam-splitters allow monitoring of the intracavity pulse evolution. The pulse-repetition rate is 62 MHz. The output pulse train is monitored with a photodetector and sampling oscilloscope with 30-GHz bandwidth. The autocorrelation can be recorded for delays up to ~100 ps. The laser is mode-locked by properly adjusting the wave plates.

FIGS. 16A, 16B and 16C show the spectra recorded at the indicated points of the cavity. The measured spectra exhibit the main features seen in the simulation results, along with a continuous-wave peak near 1035 nm. After the gain segment, the spectrum has the structure of a chirped parabolic pulse (FIG. 16A). The 30-nm bandwidth of the pulse from the gain segment increases dramatically in the PCF. At the output of the PCF, the spectrum has the shoulders and the overall bandwidth predicted by the simulations (FIG. 15B). The full-width at half-maximum bandwidth is 110 nm, and significant energy extends over nearly 200 nm at the base of the spectrum (FIG. 16B). The spectrum extends well beyond the gain bandwidth as well as the 976-nm absorption peak of Yb-doped fiber, and approaches the cut-off wavelength of ordinary SMF (920 nm). As expected, the spectrum from the NPE output port (FIG. 16C) is different from the transmitted spectrum, but the overall bandwidth, which is enough to support ~20-fs pulses, is maintained. The output pulse energy is ~1 nJ.

Dechirping the output with a pair of diffraction gratings yields pulses that exceed the transform limit by 20-30%. Multiphoton intrapulse interference phase scan (MIPS) was used to characterize the phase of the out-put pulse. The quadratic, cubic, and quartic phases in conducted measurements are typically 32,000 fs2, −4×105 fs3, and −6×106 fs4, respectively. The ration of cubic to quadratic phase is large and negative (−12 fs), which corresponds to the negative third-order dispersion of the PCF. The residual quartic phase contribution signifies a deviation from self-similar evolution in the PCF, owing to an imperfect parabolic seed from the amplifier.

Figure 17A:
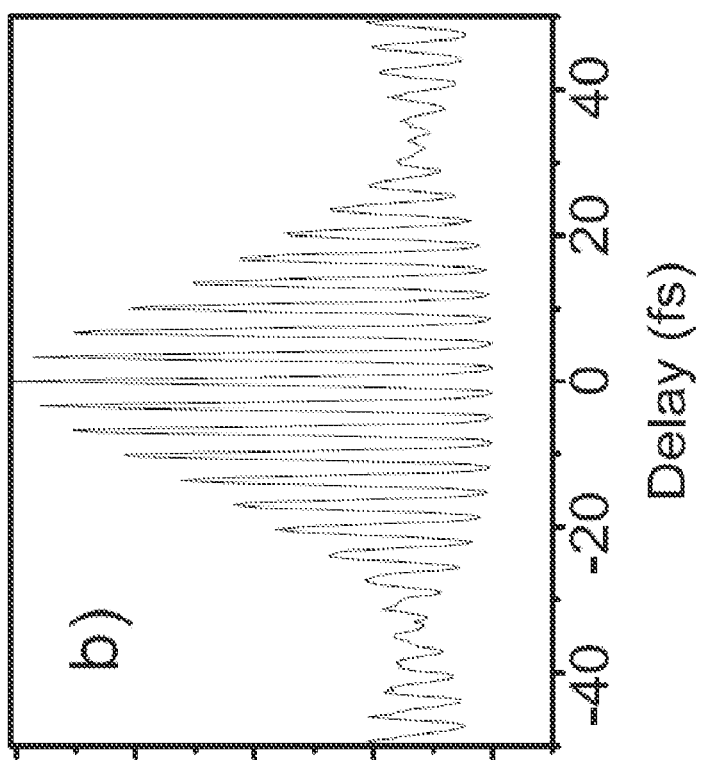
Figure 17B:
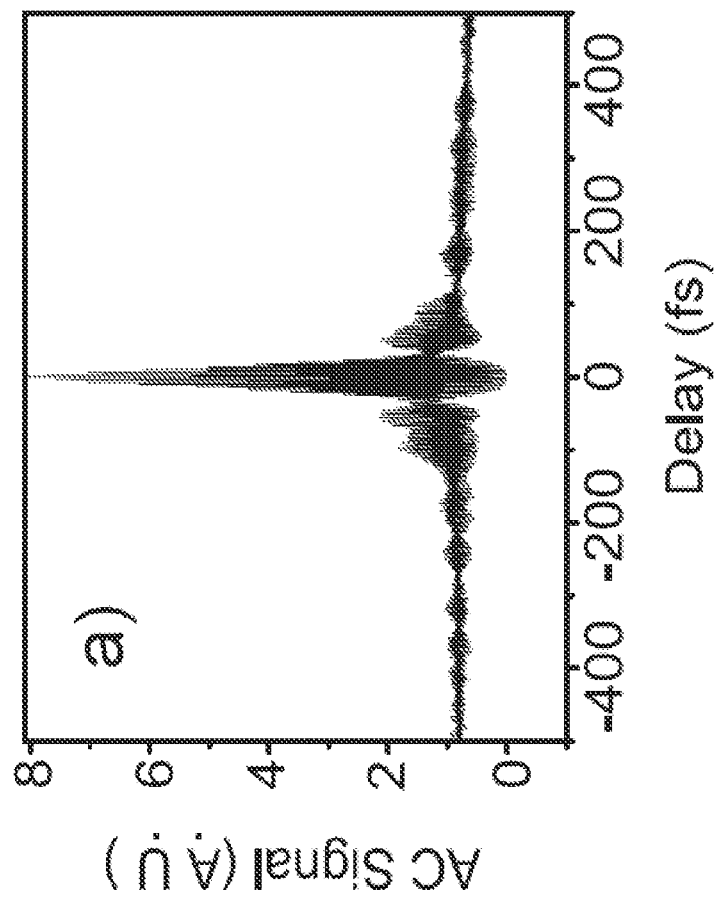

The autocorrelation of the pulse after phase correction by MIIPS (FIGS. 17A and 17B) implies a full-width at half-maximum pulse duration of 21 fs, which is close to the transform limit for the output spectrum. This corresponds to 6 cycles of the field, and is the shortest pulse generated by a fiber laser. The pulse does have significant structure in the wings, with some energy extending beyond 100 fs from the peak. As a separate assessment of pulse quality, pulses from the laser described here have produced high-resolution images by third-harmonic generation microscopy. These results confirm that coherent pulses with several times the gain bandwidth are generated.

The pulse evolution in this laser exhibits other remarkable aspects. The intracavity pulse duration varies between 1 and 10 ps, yet the pulse can be dechirped outside the cavity to ~20 fs. The spectrum broadens from 4 to 30 nm in the gain fiber, and then to nearly 200 nm (several times the gain bandwidth) in the passive fiber, for an overall spectral breathing ratio of nearly 50. For comparison, in a 5-fs Ti:sapphire laser the spectrum barely exceeds the gain bandwidth, the maximum pulse duration is within 10 times the transform limit, and the spectral breathing is less than a factor of 2.

Much improvement on these initial results should be possible. The parabolic pulse launched into the passive nonlinear segment helps to control the nonlinear phase accumulation, but the pulse clearly does not remain parabolic. This work can be extended by continuing the ideal self-similar evolution from the gain segment in a section without bandwidth limitations. This is theoretically possible with a dispersion decreasing fiber (DDF), where the resulting system is formally equivalent to a gain fiber. In addition to the potential of unbounded increase in bandwidth, it is expected that the pulse is to be closer to a parabola and therefore would have a nearly-linear chirp. Indeed, numerical simulations show that the use of a dispersion-decreasing fiber should allow the generation of broader and less-structured spectra, with smaller higher-order phase to be corrected. Initial results show pulse durations around 10 fs. The 1-nJ pulse energy of the fiber laser is modest, but already comparable to the energy of few-cycle Ti:sapphire lasers, e.g. Scaling the fiber segments to larger cores may be used to obtain few-cycle and ~100-nJ pulses from fiber lasers based on self-similar evolution.

Therefore, in the fiber laser designs described herein, the gain bandwidth no longer presents a fundamental limitation to the minimum pulse duration in an amplifier-similariton laser. The spectrum can be broadened well beyond the gain bandwidth in a nonlinear segment, and filtering produces the seed pulse to the amplifier that allows a self-consistent solution. Spectral broadening of a parabolic input pulse in a nonlinear fiber yields 200-nm bandwidth and 21-fs (6-cycle) pulses. This opens a promising route to the development of few-cycle fiber lasers.

Referring back to FIG. 1B, a dispersion-decreasing fiber (DDF) with appropriate dispersion curve after the gain can be used as the spectral broadening fiber segment 160 to provide continuous self-similar evolution without the gain-bandwidth limit. Conducted simulation and tests demonstrate that DDF-based self-similar evolution can be used for short-pulse generation.

Figure 18B:
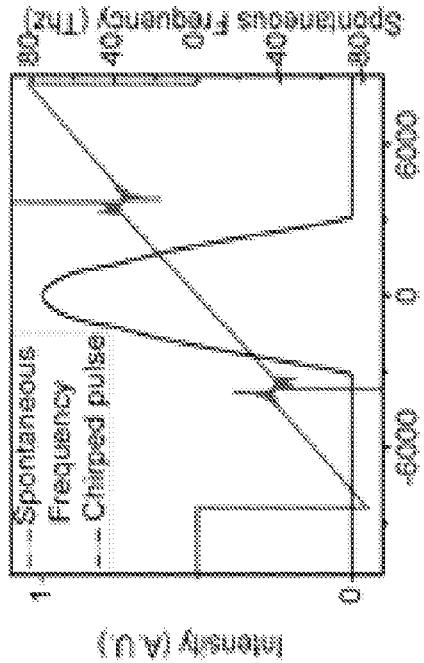
Figure 18D:
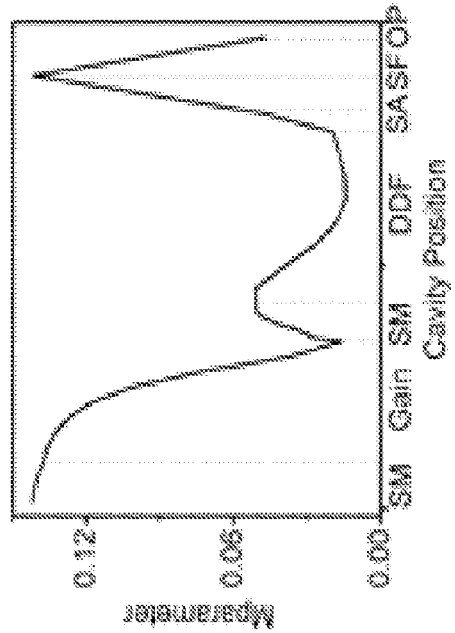
Figure 18A:
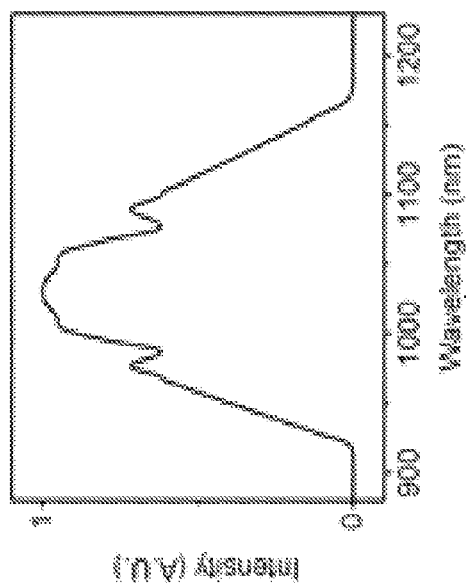

FIG. 18A shows simulated spectrum and calculated transform limit pulse (inset).

Figure 18C:
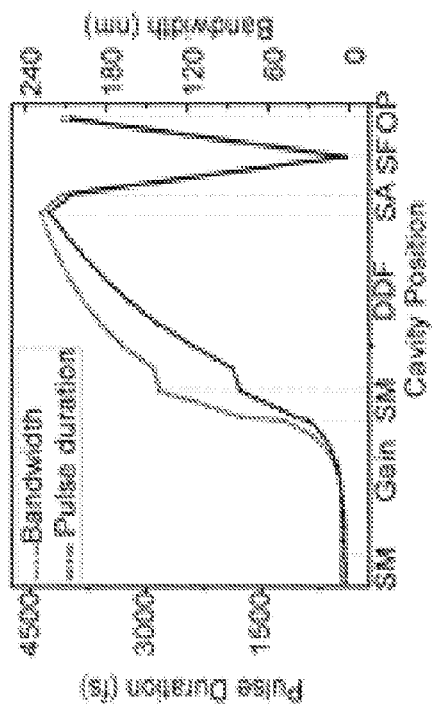

FIG. 18B shows exemplary chirped pulse and its spontaneous frequency. FIG. 18C shows exemplary bandwidth and pulse duration evolution. FIG. 18D shows exemplary evolution of the M parameter, which is the mean-square difference between the pulse and a parabola with the same energy. M=0.14 for a Gaussian pulse and M<0.6 indicates a parabolic pulse.

Figure 19:
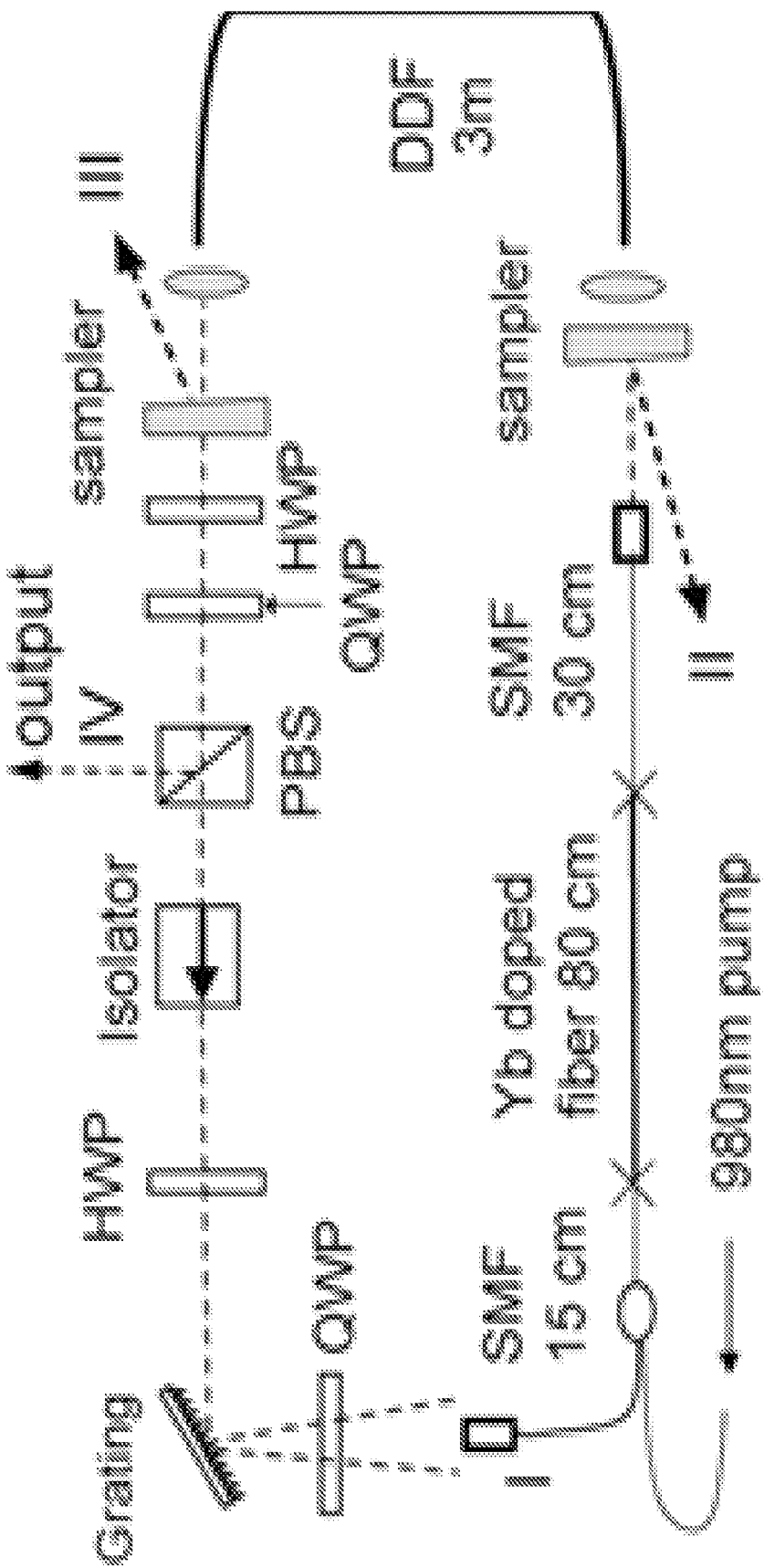

FIG. 19 shows an example of a fiber laser based on DDF. DDFs were fabricated by tapering a photonic crystal fiber under computer control during the fiber draw. The tapered fibers were 4.3 m long, with the dispersion varying from 4 to 74 fs2/mm along that length. In the simulations the nonlinearity of the DDF was assumed to be constant since the variation of core size is small. A 4 nm filter was used to stabilize the cavity. Stable solutions were found with various DDF lengths. The best performance is obtained with 1.2 m of DDF, for which the initial dispersion value matches the gain fiber, 23 fs^2/mm, Pulses as short as 14 fs are produced in the simulation.

In the simulated pulse evolution and performance in FIG. 18A-D, the pulse has linear chirp (FIG. 18B) with energy of 2 nJ. The transform limited pulse from the spectrum is 14 fs (FIG. 18A inset). The spectrum and pulse broaden continuously inside the gain and DDF. (FIGS. 18D and 18D) show that the pulse is drawn to a parabola inside the gain and after a disruption in a short segment of ordinary fiber, it continues to evolve into a parabola within the DDF. This demonstrates that the parabolic pulse is a nonlinear attractor in both the gain and DDF segments.

In the simulations the nonlinearity of the DDF was assumed to be constant since the variation of core size is small. A 4 nm filter was used to stabilize the cavity. Stable solutions were found with various DDF lengths. The best performance is obtained with 1.2 m of DDF, for which the initial dispersion value matches the gain fiber, 23 fs$^2$/mm, Pulses as short as 14 fs are produced in the simulation. The results in FIGS. 18A-D show the simulated pulse evolution and performance. The pulse has linear chirp with energy of 2 nJ. The transform limited pulse from the spectrum is 14 fs. The spectrum and pulse broaden continuously inside the gain and DDF. The pulse is drawn to a parabola inside the gain and after a disruption in a short segment of ordinary fiber, it continues to evolve into a parabola within the DDF. This demonstrates that the parabolic pulse is a nonlinear attractor in both the gain and DDF segments.

A cavity with the above simulated design was applied in tests in FIG. 19. A grating and a collimator made a 4 nm filter. Nonlinear polarization evolution (NPE) is employed as a saturable absorber. Mode locking is achieved by adjusting the wave plates. The sampler plates are used to monitor the spectrum evolution. The length of DDF has been varied from 4.4 m to 3 m, and the mode locking results have agreed well with the simulation trends. The spectrum directly after the DDF bears some resemblance to the simulated spectrum. However the NPE filtering tends to create structure on the output spectrum. The cavity generates 1-nJ pulses. The dechirped pulse has a narrow full-width at half-maximum duration but much secondary structure. The dechirped pulse is 20 fs (6 cycles) in full-width. We attribute the structure to residual higher-order dispersion of the dispersive delay.

Figure 20:
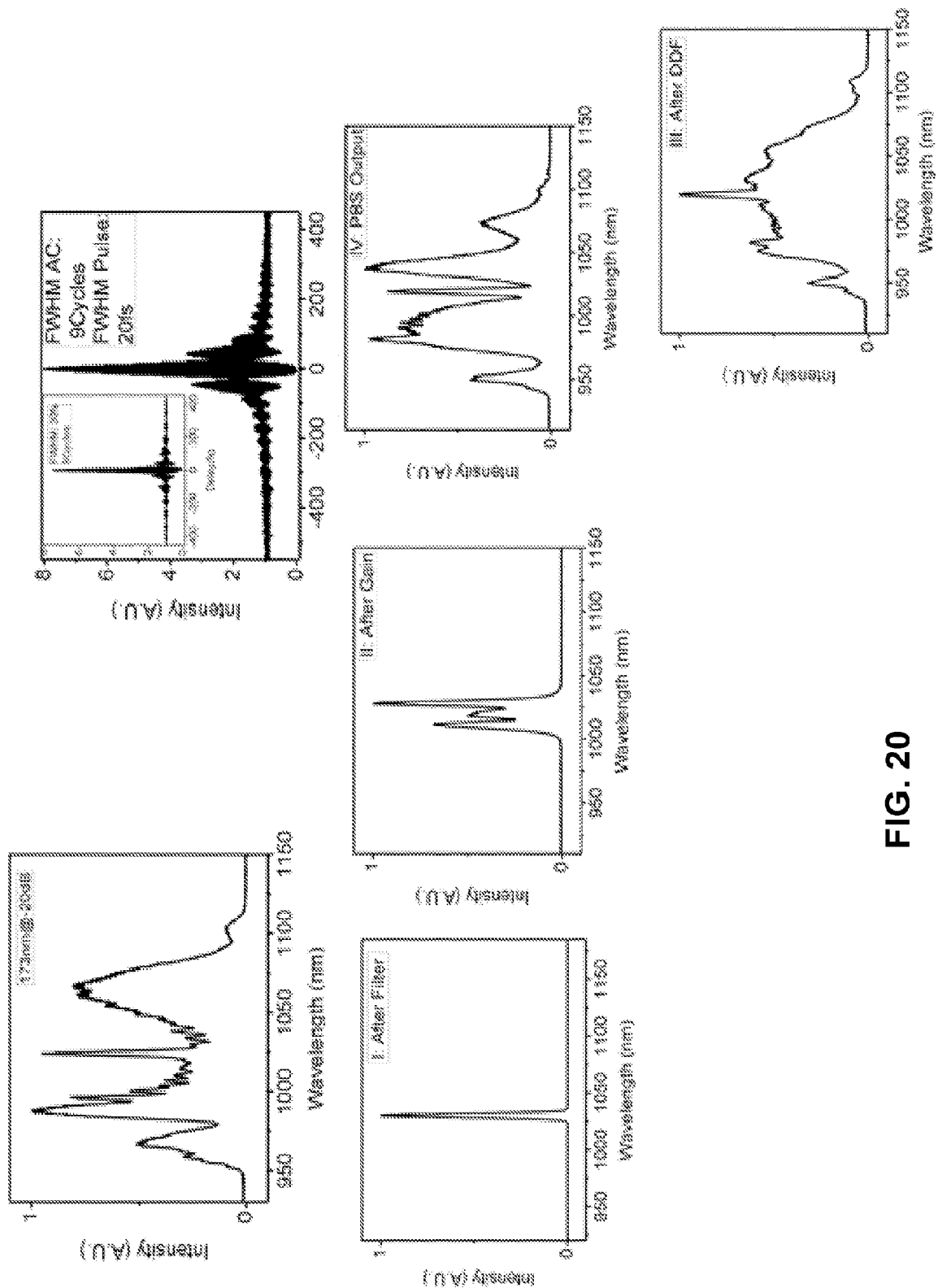

FIG. 20 show test results. I: calculated spectrum of the Gaussian filter. II, III, and IV shows different experiment spectra inside the cavity. Experiment result: (b) Spectrum from PBS. (c) Dechirped autocorrelation and calculated transform limit autocorrelation(inset)

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A method for operating a fiber laser to generate broadband laser pulses with a spectral bandwidth greater than a gain spectral bandwidth of a gain fiber segment in the fiber laser, comprising:

providing a ring laser cavity to include a gain fiber segment having a gain spectral bandwidth, a spectral broadening fiber segment coupled to receive output light from the gain fiber segment, and an optical spectral filter coupled to receive light from the spectral broadening fiber segment to circulate laser pulses in a closed optical loop to, sequentially, pass through the gain fiber segment, the spectral broadening fiber segment and the optical spectral filter;

operating the optical spectral filter to output filtered light to the gain fiber segment downstream in the closed optical loop to selectively transmit light in a narrow spectral band while rejecting light outside the narrow spectral band and to have a bandwidth for the narrowband that is sufficiently narrow to cause each laser pulse to be self similar after propagating through the gain fiber segment; and directing amplified laser pulses out of the gain fiber segment into the spectral broadening fiber segment to produce chirped self-similar laser pulses circulating in the fiber laser to have a pulse spectral bandwidth in each laser pulse output by the spectral broadening fiber segment to be greater than the gain spectral bandwidth of the gain fiber segment, wherein the spectral broadening fiber segment and the optical spectral filter collected to cause each laser pulse to have a varying spectral width in the closed optical loop that reaches a maximum spectral width value at the exit of the spectral broadening fiber segment and a minimum spectral width value at the output of the optical spectral filter.

2. The method as in claim 1, comprising:
coupling laser pulses out of the fiber laser at a location between the spectral broadening fiber segment and the optical spectral filter as output laser pulses.

3. The method as in claim 2, comprising:
de-chirping the output laser pulses to compress a pulse duration of each output laser pulse.

4. The method as in claim 1, comprising:
configuring the fiber laser to include a saturable absorber coupled to receive output light from the gain fiber segment; and
coupling the spectral broadening fiber segment in the fiber laser between the saturable absorber and the gain fiber segment.

5. The method as in claim 1, comprising:
using a high nonlinear fiber segment as the spectral broadening fiber segment to have an optical nonlinearity greater than an optical nonlinearity in the gain fiber segment.

6. The method as in claim 5, comprising:
configuring the nonlinear fiber segment in the fiber laser to have a dispersion lower than a dispersion in the gain fiber segment a fiber.

7. The method as in claim 1, comprising:
using a high nonlinear fiber segment as the spectral broadening fiber segment to have an optical nonlinearity greater than an optical nonlinearity in the gain fiber segment and a dispersion lower than a dispersion in the gain fiber segment a fiber.

8. The method as in claim 1, comprising:
using a dispersion decreasing fiber segment which has a dispersion that decreases with position along the dispersion decreasing fiber segment as the spectral broadening fiber segment to produce stable soliton laser pulses circulating in the fiber laser.

9. The method as in claim 8, comprising:
configuring the fiber laser to include a saturable absorber coupled to receive output light from the gain fiber segment;
coupling dispersion decreasing fiber segment as the spectral broadening fiber segment in the fiber laser between the saturable absorber and the gain fiber segment; and
configuring the dispersion decreasing fiber segment to have, at a beginning segment that connects to the saturable absorber to receive output light from the saturable absorber, a dispersion that matches a dispersion of the gain fiber segment.

10. A fiber laser for generating broadband laser pulses with a spectral bandwidth greater than a gain spectral bandwidth of a gain fiber segment in the fiber laser, comprising:

a gain fiber segment having a gain spectral bandwidth and operable to amplify laser pulses;

a spectral broadening fiber segment coupled to receive output light from the gain fiber segment and operable to cause spectral broadening of laser pulses to have a spectral bandwidth greater than the gain spectral bandwidth of the gain fiber segment; and an optical spectral filter coupled to receive light from the spectral broadening fiber segment to output filtered light to the gain fiber segment to selectively transmit light in a narrow spectral band while rejecting light outside the narrow spectral band and to have a bandwidth for the narrowband that is sufficiently narrow to cause each laser pulse to be self similar after propagating through the gain fiber segment, wherein the fiber laser is configured to form a unidirectional closed optical loop by the gain fiber segment, the spectral broadening fiber segment and the optical spectral filter to direct each laser pulse, sequentially, through the gain fiber segment, the spectral broadening fiber segment and the optical spectral filter; and wherein the fiber laser couples light out of the closed optical loop at a location between the spectral broadening fiber segment and the optical spectral filter to produce output laser pulses with a pulse spectral bandwidth greater than the gain spectral bandwidth.

11. The fiber laser as in claim 10, comprising:
an optical coupler at a location between the spectral broadening fiber segment and the optical spectral filter to couple laser pulses out of the fiber laser as output laser pulses.

12. The fiber laser as in claim 10, comprising:
an optical element outside the closed optical loop in an optical path of the output laser pulses to de-chirp the output laser pulses to compress a pulse duration of each output laser pulse.

13. The fiber laser as in claim 10, comprising:
a saturable absorber coupled in the closed optical loop to receive output light from the gain fiber segment at a location so that the spectral broadening fiber segment is between the saturable absorber and the gain fiber segment.

14. The fiber laser as in claim 10, wherein:
the spectral broadening fiber segment includes a high nonlinear fiber segment which exhibits an optical nonlinearity greater than an optical nonlinearity in the gain fiber segment.

15. The fiber laser as in claim 14, wherein:
the nonlinear fiber segment in the fiber laser has a dispersion lower than a dispersion in the gain fiber segment a fiber.

16. The fiber laser as in claim 10, wherein:
the spectral broadening fiber segment includes a high nonlinear fiber segment which exhibits an optical nonlinearity greater than an optical nonlinearity in the gain fiber segment and a dispersion lower than a dispersion in the gain fiber segment a fiber.

17. The fiber laser as in claim 10, wherein:
the spectral broadening fiber segment includes using a dispersion decreasing fiber segment which has a dispersion that decreases with position along the dispersion decreasing fiber segment to produce stable soliton laser pulses circulating in the closed optical loop.

18. The fiber laser as in claim 17, comprising:
a saturable absorber coupled in the closed optical loop to receive output light from the gain fiber segment;

wherein the dispersion decreasing fiber segment as the spectral broadening fiber segment in the fiber laser is located between the saturable absorber and the gain fiber segment; and wherein the dispersion decreasing fiber segment exhibits, at a beginning segment that connects to the saturable absorber to receive output light from the saturable absorber, a dispersion that matches a dispersion of the gain fiber segment.

* * * * *